US012621889B2

(12) United States Patent
Gkatzikis et al.

(10) Patent No.: US 12,621,889 B2
(45) Date of Patent: May 5, 2026

(54) APPARATUS, METHODS, AND COMPUTER PROGRAMS

(71) Applicant: NOKIA TECHNOLOGIES OY, Espoo (FI)

(72) Inventors: Lazaros Gkatzikis, Issy-les-Moulineaux (FR); Devaki Chandramouli, Plano, TX (US); Laurent Thiebaut, Antony (FR); Rainer Liebhart, Munich (DE); Mu He, Munich (DE); Georgios Gkellas, Petroupoli Attica (GR)

(73) Assignee: Nokia Technologies Oy, Espoo (FI)

( * ) Notice: Subject to any disclaimer, the term of this patent is extended or adjusted under 35 U.S.C. 154(b) by 343 days.

(21) Appl. No.: 18/108,841

(22) Filed: Feb. 13, 2023

(65) Prior Publication Data

US 2023/0262806 A1 Aug. 17, 2023

(30) Foreign Application Priority Data

Feb. 15, 2022 (EP) ..................................... 22156879

(51) Int. Cl.
| | |
|---|---|
| *H04W 76/15* | (2018.01) |
| *H04L 1/22* | (2006.01) |
| *H04W 28/02* | (2009.01) |

(52) U.S. Cl.
CPC .............. *H04W 76/15* (2018.02); *H04L 1/22* (2013.01); *H04W 28/0215* (2013.01); *H04W 28/0273* (2013.01)

(58) Field of Classification Search
CPC ............. H04W 76/15; H04W 28/0215; H04W 28/0273; H04W 28/088; H04W 28/0925;
(Continued)

(56) References Cited

U.S. PATENT DOCUMENTS

2011/0320608 A1* 12/2011 Nelakonda ............ H04W 76/15
709/226
2020/0068653 A1 2/2020 Li et al.
(Continued)

FOREIGN PATENT DOCUMENTS

WO 2019/096186 A1 5/2019
WO WO-2023148124 A1 * 8/2023

OTHER PUBLICATIONS

3GPP TR 23.725 V16.2.0 (Jun. 2019), Technical Report, 3rd Generation Partnership Project; Technical Specification Group Services and System Aspects; Study on enhancement of Ultra-Reliable Low-Latency Communication (URLLC) support in the 5G Core network (5GC) (Release 16), Jun. 2019.
(Continued)

*Primary Examiner* — Sudesh M. Patidar
(74) *Attorney, Agent, or Firm* — Nokia Technologies Oy

(57) ABSTRACT

There is provided a method for an apparatus for a network function, the apparatus for the network function, and a computer program for the apparatus, that causes the apparatus to: receive an indication that a first user equipment and/or a first user plane function configured to transmit first user traffic is associated with a first replication handling function, the first replication handling function being configurable to coordinate at least one replication-based redundancy mechanism performed on at least part of said first user traffic; determine a first set of replication rules for use by the first replication handling function determining when the at least one replication-based redundancy mechanism is performed on at least part of said first user traffic; and cause the first set of replication rules to be provided to the first replication handling function.

11 Claims, 12 Drawing Sheets

(58) Field of Classification Search

CPC ............. H04W 28/08; H04W 28/0858; H04W 28/0992; H04L 1/22

See application file for complete search history.

(56) References Cited

U.S. PATENT DOCUMENTS

| | | | | |
|---|---|---|---|---|
| 2020/0084663 A1* | 3/2020 | Park | ......................... | H04W 8/08 |
| 2021/0250788 A1 | 8/2021 | Kim et al. | | |
| 2022/0369404 A1* | 11/2022 | Gundavelli | ........... | H04W 76/15 |
| 2024/0007925 A1* | 1/2024 | Li | ......................... | H04W 40/02 |
| 2024/0138015 A1* | 4/2024 | Sharma | ................. | H04W 12/06 |
| 2024/0349158 A1* | 10/2024 | Li | ......................... | H04W 40/02 |
| 2025/0159749 A1* | 5/2025 | Li | ........................... | H04L 47/78 |

OTHER PUBLICATIONS

3GPP TS 23.501 V17.3.0 (Dec. 2021), Technical Specification, 3rd Generation Partnership Project; Technical Specification Group Services and System Aspects; System architecture for the 5G System (5GS); Stage 2 (Release 17), Dec. 2021.

"Future Railway Mobile Communication System, System Requirements Specification", FRMCS AT Working Group, FW-AT 7800, V1.0.0, Feb. 13, 2023, pp. 1-109.

"3rd Generation Partnership Project; Technical Specification Group Services and System Aspects; Procedures for the 5G System (5GS); Stage 2 (Release 17)", 3GPP TS 23.502, V17.2.1, Sep. 2021, pp. 1-712.

"IEEE Standard for Local and metropolitan area networks—Frame Replication and Elimination for Reliability", IEEE Computer Society, IEEE Std 802.1CB™—2017, Sep. 28, 2017, 102 pages.

Partial European search report received for corresponding European Patent Application No. 22156879.3, dated Jul. 21, 2022, 23 pages.

"PCF checking of redundant PDU session applicability", 3GPP TSG-CT3 Meeting #119bis-e, C3-220393, Ericsson, Jan. 17-21, 2022, 3 pages.

"5G URLLC: Optimizing Redundancy", 3GPP TSG-SA WG2 Meeting #133, S2-1906521, Nokia, May 13-17, 2019, pp. 1-7.

Extended European Search Report received for corresponding European Patent Application No. 22156879.3, dated Oct. 17, 2022, 27 pages.

"3rd Generation Partnership Project; Technical Specification Group Services and System Aspects; Study on access traffic steering, switching and splitting support in the 5G system architecture; Phase 3 (Release 18)", 3GPP TR 23.700-53 V18.0.0, Dec. 2022, pp. 1-102.

Office Action received for corresponding European Patent Application No. 22156879.3, dated Dec. 16, 2025, 13 pages.

* cited by examiner

APPARATUS, METHODS, AND COMPUTER PROGRAMS

CROSS REFERENCE TO RELATED APPLICATION

This application claims the benefit of European Patent Application No. 22156879.3, filed Feb. 15, 2022. The entire content of the above-referenced application is hereby incorporated by reference.

FIELD

Various examples described herein generally relate to apparatus, methods, and computer programs, and more particularly (but not exclusively) to apparatus, methods and computer programs for network apparatuses.

BACKGROUND

In general, a communication system can be seen as a facility that enables communication sessions between two or more entities such as user terminals, access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

There is a need to provide control systems which enable a communications service provider (CSP) to control and optimise a complex network of communications system elements.

One of current approaches being employed is closed-loop automation and machine learning which can be built into self-organizing networks (SON) enabling an operator to automatically optimize every cell in the radio access network.

SUMMARY

According to a first aspect, there is provided an apparatus for a network function, the apparatus comprising means for:

receiving an indication that a first user equipment and/or a first user plane function configured to transmit first user traffic is associated with a first replication handling function, the first replication handling function being configurable to coordinate at least one replication-based redundancy mechanism performed on at least part of said first user traffic; determining a first set of replication rules for use by the first replication handling function determining when the at least one replication-based redundancy mechanism is performed on at least part of said first user traffic; and causing the first set of replication rules to be provided to the first replication handling function.

The means for determining the set of replication rules may comprise means for determining the first set of replication rules using a rule selection policy that is common to said network function and another network function.

The apparatus may comprise means for: identifying a second replication handling function associated with at least one user plane function configured to receive at least part of said first user traffic and/or to transmit second user traffic to the first user equipment and/or to the first user plane function; determining a second set of replication rules for use by the second replication handling function when determining when to perform at least one replication-based redundancy mechanism on at least part of said second user traffic; and causing the second set of replication rules to be provided to the second replication handling function.

The apparatus may comprise means for determining that the first user equipment is comprised in a same apparatus as a second user equipment and/or that the first user plane function is comprised in a same apparatus as a second user plane function.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a second aspect, there is provided an apparatus for a first user equipment, the apparatus comprising means for: signalling, to a network, an indication that the first user equipment is associated with a first replication handling function, the first replication handling function being configurable to coordinate at least one replication-based redundancy mechanism performed by the first user equipment on first user traffic; and receiving, from the network in response to said signalling, a first set of replication rules for use by the replication handling function when determining when the at least one replication-based redundancy mechanism is performed by the first user equipment; and providing the first set of replication rules to the replication handling function.

The means for signalling the indication may comprise means for comprising said indication in a capability indication during registration of the user equipment with the network.

The apparatus may further comprise means for: signalling a first request to establish a first data session; receiving, from the network, a bundle identifier for identifying sessions linked to the first session in response to signalling the first request; and providing the bundle identifier to the replication handling function.

The apparatus may further comprise means for: signalling, to a network, a request to establish a second data session, wherein said request comprises the bundle identifier.

The apparatus may comprise the first user equipment, the replication handing function, and a second user equipment.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a third aspect, there is provided an apparatus for a first replication handling function associated with a first one user equipment, the apparatus comprising means for: causing signalling, to a network, an indication that the first user equipment is associated with the first replication handling function, the first replication handling function being configurable to coordinate at least one replication-based redundancy mechanism performed by the first user equipment on first user traffic; and receiving, from the at least one user equipment, a first set of replication rules.

The apparatus may comprise means for: using the first set of replication rules to determine when at least one replication-based redundancy mechanism is be performed by the first user equipment for a first data packet; and causing the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment, and the apparatus may comprises means for: using the first set of replication rules to determine when at least one replication-based redundancy mechanism is be performed by the second user equipment for a second data packet; and causing the second user equipment to perform the at least one replication-based redundancy mechanism for the second packet when it is determined that said at least one replication-based redundancy is to be performed.

The apparatus may comprise means for causing signalling, to the network, an indication that the second user equipment is associated with the first replication handling function.

The apparatus may comprise means for: receiving, from the first user equipment, a bundle identifier for use in identifying linked sessions; and providing the bundle identifier to the second user equipment for use in the second user equipment establishing a session.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a fourth aspect, there is provided an apparatus for a session management function, the apparatus comprising means for: receiving, from a first user equipment, a first request to establish a first data session for transmitting first data traffic; determining, using at least one identifier comprised in the first request whether the first data session is linked or will be linked to a second data session for transmitting the first data traffic; and in response to a positive determination, signalling, to a storage function and/or to the first user equipment, an indication of mapping information for the first data session Said mapping information to the first data session may comprise at least one of: a session identifier and/or an indication of a user plane entity selected for the first session.

The apparatus may comprise means for: receiving, from a user equipment, a second request to establish a further data session; determining that the further data session may be linked to the first data session; in response to a positive determination, retrieving, from a storage function, mapping information indicating a first session and a user plane entity selected for the first session; selecting a same user plane entity for the first and further data sessions using the retrieved mapping; and providing the user plane entity with information for mapping the first and further data sessions.

The apparatus may comprise means for retrieving mapping information for the further session from the storage function.

The apparatus may comprising means for: receiving, from a policy and control function, a first set of replication rules to be applied by a replication handling function for the first and second sessions; and providing the first set of replication rules to the replication handling function.

The apparatus may comprise means for: providing the first set of replication rules to the replication handling function at the user equipment side and/or to the replication handling function at the network side.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

According to a fifth aspect, there is provided an apparatus for a storage function located in a network, the apparatus comprising means for: receiving, from a network function, mapping information indicating a data session and a user plane entity selected for that session; storing said mapping information; and in response to a request from a network function, providing said mapping to the requesting network function or providing to the requesting network function an indication that no such mapping exists.

The network function may be a session management function.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

According to a sixth aspect, there is provided an apparatus for a network function, the apparatus comprising: at least one processor; and at least one memory comprising code that, when run on the at least one processor, causes the apparatus to: receive an indication that a first user equipment and/or a first user plane function configured to transmit first user traffic is associated with a first replication handling function, the first replication handling function being configurable to coordinate at least one replication-based redundancy mechanism performed on at least part of said first user traffic; determine a first set of replication rules for use by the first replication handling function determining when the at least one replication-based redundancy mechanism is performed on at least part of said first user traffic; and cause the first set of replication rules to be provided to the first replication handling function.

The determining the set of replication rules may comprise determining the first set of replication rules using a rule selection policy that is common to said network function and another network function.

The apparatus may be caused to: identify a second replication handling function associated with at least one user plane function configured to receive at least part of said first user traffic and/or to transmit second user traffic to the first user equipment and/or to the first user plane function; determine a second set of replication rules for use by the second replication handling function when determining when to perform at least one replication-based redundancy mechanism on at least part of said second user traffic; and cause the second set of replication rules to be provided to the second replication handling function.

The apparatus may be caused to determine that the first user equipment is comprised in a same apparatus as a second user equipment and/or that the first user plane function is comprised in a same apparatus as a second user plane function.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a seventh aspect, there is provided an apparatus for a first user equipment, the apparatus comprising: at least one processor; and at least one memory comprising code that, when executed by the at least one processor, causes the processor to: signal, to a network, an indication that the first user equipment is associated with a first replication handling function, the first replication handling function being configurable to coordinate at least one replication-based redundancy mechanism performed by the first user equipment on first user traffic; and receive, from the network in response to said signalling, a first set of replication rules for use by the replication handling function when determining when the at least one replication-based redundancy mechanism is performed by the first user equipment; and provide the first set of replication rules to the replication handling function.

The signalling the indication may comprise comprising said indication in a capability indication during registration of the user equipment with the network.

The apparatus may further be caused to: signal a first request to establish a first data session; receiving, from the network, a bundle identifier for identifying sessions linked to the first session in response to signalling the first request; and provide the bundle identifier to the replication handling function.

The apparatus may further be caused to: signal, to a network, a request to establish a second data session, wherein said request comprises the bundle identifier.

The apparatus may comprise the first user equipment, the replication handing function, and a second user equipment.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to an eighth aspect, there is provided an apparatus for a first replication handling function associated with a first one user equipment, the apparatus comprising: at least one processor; and at least one memory comprising code that, when executed by the at least one processor, causes the processor to: cause signalling, to a network, an indication that the first user equipment is associated with the first replication handling function, the first replication handling function being configurable to coordinate at least one replication-based redundancy mechanism performed by the first user equipment on first user traffic; and receive, from the at least one user equipment, a first set of replication rules.

The apparatus may be caused to: use the first set of replication rules to determine when at least one replication-based redundancy mechanism is be performed by the first user equipment for a first data packet; and cause the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment, and the apparatus may be caused to: use the first set of replication rules to determine when at least one replication-based redundancy mechanism is be performed by the second user equipment for a second data packet; and cause the second user equipment to perform the at least one replication-based redundancy mechanism for the second packet when it is determined that said at least one replication-based redundancy is to be performed.

The apparatus may be caused to cause signalling, to the network, an indication that the second user equipment is associated with the first replication handling function.

The apparatus may be caused to: receive, from the first user equipment, a bundle identifier for use in identifying linked sessions; and provide the bundle identifier to the second user equipment for use in the second user equipment establishing a session.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a ninth aspect, there is provided an apparatus for a session management function, the apparatus comprising: at least one processor; and at least one memory comprising code that, when executed by the at least one processor, causes the processor to: receive, from a first user equipment, a first request to establish a first data session for transmitting first data traffic; determine, using at least one identifier comprised in the first request whether the first data session is linked or will be linked to a second data session for transmitting the first data traffic; and in response to a positive determination, signal, to a storage function and/or to the first user equipment, an indication of mapping information for the first data session Said mapping information to the first data session may comprise at least one of: a session identifier and/or an indication of a user plane entity selected for the first session.

The apparatus may be caused to: receive, from a user equipment, a second request to establish a further data session; determine that the further data session may be linked to the first data session; in response to a positive determination, retrieving, from a storage function, mapping information indicating a first session and a user plane entity selected for the first session; select a same user plane entity for the first and further data sessions using the retrieved mapping; and provide the user plane entity with information for mapping the first and further data sessions.

The apparatus may be caused to retrieve mapping information for the further session from the storage function.

The apparatus may be caused to: receive, from a policy and control function, a first set of replication rules to be applied by a replication handling function for the first and second sessions; and providing the first set of replication rules to the replication handling function.

The apparatus may be caused to: provide the first set of replication rules to the replication handling function at the user equipment side and/or to the replication handling function at the network side.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

According to a tenth aspect, there is provided an apparatus for a storage function located in a network, the apparatus comprising: at least one processor; and at least one memory comprising code that, when executed by the at least one processor, causes the processor to: receive, from a network function, mapping information indicating a data session and a user plane entity selected for that session; storing said mapping information; and in response to a request from a network function, provide said mapping to the requesting network function or providing to the requesting network function an indication that no such mapping exists.

The network function may be a session management function.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

According to an eleventh aspect, there is provided a method for an apparatus for a network function, the method comprising: receiving an indication that a first user equipment and/or a first user plane function configured to transmit first user traffic is associated with a first replication handling function, the first replication handling function being configurable to coordinate at least one replication-based redundancy mechanism performed on at least part of said first user traffic; determining a first set of replication rules for use by the first replication handling function determining when the at least one replication-based redundancy mechanism is performed on at least part of said first user traffic; and causing the first set of replication rules to be provided to the first replication handling function.

The determining the set of replication rules may comprise determining the first set of replication rules using a rule selection policy that is common to said network function and another network function.

The method may comprise: identifying a second replication handling function associated with at least one user plane function configured to receive at least part of said first user traffic and/or to transmit second user traffic to the first user equipment and/or to the first user plane function; determining a second set of replication rules for use by the second replication handling function when determining when to perform at least one replication-based redundancy mechanism on at least part of said second user traffic; and causing the second set of replication rules to be provided to the second replication handling function.

The method may comprise determining that the first user equipment is comprised in a same apparatus as a second user equipment and/or that the first user plane function is comprised in a same apparatus as a second user plane function.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a twelfth aspect, there is provided a method for an apparatus for a first user equipment, the method comprising: signalling, to a network, an indication that the first user equipment is associated with a first replication handling function, the first replication handling function being configurable to coordinate at least one replication-based redundancy mechanism performed by the first user equipment on first user traffic; and receiving, from the network in response to said signalling, a first set of replication rules for use by the replication handling function when determining when the at least one replication-based redundancy mechanism is performed by the first user equipment; and providing the first set of replication rules to the replication handling function.

The signalling the indication may comprise comprising said indication in a capability indication during registration of the user equipment with the network.

The method may further comprise: signalling a first request to establish a first data session; receiving, from the network, a bundle identifier for identifying sessions linked to the first session in response to signalling the first request; and providing the bundle identifier to the replication handling function.

The method may further comprise: signalling, to a network, a request to establish a second data session, wherein said request comprises the bundle identifier.

The apparatus may comprise the first user equipment, the replication handing function, and a second user equipment.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a thirteenth aspect, there is provided a method for an apparatus for a first replication handling function associated with a first one user equipment, the method comprising: causing signalling, to a network, an indication that the first user equipment is associated with the first replication handling function, the first replication handling function being configurable to coordinate at least one replication-based redundancy mechanism performed by the first user equipment on first user traffic; and receiving, from the at least one user equipment, a first set of replication rules.

The method may comprise: using the first set of replication rules to determine when at least one replication-based redundancy mechanism is be performed by the first user equipment for a first data packet; and causing the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment, and the method may comprise: using the first set of replication rules to determine when at least one replication-based redundancy mechanism is be performed by the second user equipment for a second data packet; and causing the second user equipment to perform the at least one replication-based redundancy mechanism for the second packet when it is determined that said at least one replication-based redundancy is to be performed.

The method may comprise causing signalling, to the network, an indication that the second user equipment is associated with the first replication handling function.

The method may comprise: receiving, from the first user equipment, a bundle identifier for use in identifying linked sessions; and providing the bundle identifier to the second user equipment for use in the second user equipment establishing a session.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a fourteenth aspect, there is provided a method for an apparatus for a session management function, the method comprising: receiving, from a first user equipment, a first request to establish a first data session for transmitting first data traffic; determining, using at least one identifier comprised in the first request whether the first data session is linked or will be linked to a second data session for transmitting the first data traffic; and in response to a positive determination, signalling, to a storage function and/or to the first user equipment, an indication of mapping information for the first data session Said mapping information to the first data session may comprise at least one of: a session identifier and/or an indication of a user plane entity selected for the first session.

The method may comprise: receiving, from a user equipment, a second request to establish a further data session; determining that the further data session may be linked to the first data session; in response to a positive determination, retrieving, from a storage function, mapping information indicating a first session and a user plane entity selected for the first session; selecting a same user plane entity for the first and further data sessions using the retrieved mapping; and providing the user plane entity with information for mapping the first and further data sessions.

The method may comprise retrieving mapping information for the further session from the storage function.

The method may comprise: receiving, from a policy and control function, a first set of replication rules to be applied by a replication handling function for the first and second sessions; and providing the first set of replication rules to the replication handling function.

The method may comprise: providing the first set of replication rules to the replication handling function at the user equipment side and/or to the replication handling function at the network side.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

According to a fifteenth aspect, there is provided a method for an apparatus for a storage function located in a network, the method comprising: receiving, from a network function, mapping information indicating a data session and a user plane entity selected for that session; storing said mapping information; and in response to a request from a network function, providing said mapping to the requesting network function or providing to the requesting network function an indication that no such mapping exists.

The network function may be a session management function.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

According to a sixteenth aspect, there is provided an apparatus for a network function, the apparatus comprising: receiving circuitry for receiving an indication that a first user equipment and/or a first user plane function configured to transmit first user traffic is associated with a first replication handling function, the first replication handling function being configurable to coordinate at least one replication-based redundancy mechanism performed on at least part of said first user traffic; determining circuitry for determining a first set of replication rules for use by the first replication handling function determining when the at least one replication-based redundancy mechanism is performed on at least part of said first user traffic; and causing circuitry for causing the first set of replication rules to be provided to the first replication handling function.

The determining circuitry for determining the set of replication rules may comprise determining circuitry for determining the first set of replication rules using a rule selection policy that is common to said network function and another network function.

The apparatus may comprise: identifying circuitry for identifying a second replication handling function associated with at least one user plane function configured to receive at least part of said first user traffic and/or to transmit second user traffic to the first user equipment and/or to the first user plane function; determining circuitry for determining a second set of replication rules for use by the second replication handling function when determining when to perform at least one replication-based redundancy mechanism on at least part of said second user traffic; and causing circuitry for causing the second set of replication rules to be provided to the second replication handling function.

The apparatus may comprise determining circuitry for determining that the first user equipment is comprised in a same apparatus as a second user equipment and/or that the first user plane function is comprised in a same apparatus as a second user plane function.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a seventeenth aspect, there is provided an apparatus for a first user equipment, the apparatus comprising: signalling circuitry for signalling, to a network, an indication that the first user equipment is associated with a first replication handling function, the first replication handling function being configurable to coordinate at least one replication-based redundancy mechanism performed by the first user equipment on first user traffic; and receiving circuitry for receiving, from the network in response to said signalling, a first set of replication rules for use by the replication handling function when determining when the at least one replication-based redundancy mechanism is performed by the first user equipment; and providing circuitry for providing the first set of replication rules to the replication handling function.

The signalling circuitry for signalling the indication may comprise comprising circuitry for comprising said indication in a capability indication during registration of the user equipment with the network.

The apparatus may further comprise: signalling circuitry for signalling a first request to establish a first data session; receiving, from the network, a bundle identifier for identifying sessions linked to the first session in response to signalling the first request; and providing circuitry for providing the bundle identifier to the replication handling function.

The apparatus may further comprise: signalling circuitry for signalling, to a network, a request to establish a second data session, wherein said request comprises the bundle identifier.

The apparatus may comprise the first user equipment, the replication handing function, and a second user equipment.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to an eighteenth aspect, there is provided an apparatus for a first replication handling function associated with a first one user equipment, the apparatus comprising: causing circuitry for causing signalling, to a network, an indication that the first user equipment is associated with the first replication handling function, the first replication handling function being configurable to coordinate at least one replication-based redundancy mechanism performed by the first user equipment on first user traffic; and receiving circuitry for receiving, from the at least one user equipment, a first set of replication rules.

The apparatus may comprise: using circuitry for using the first set of replication rules to determine when at least one replication-based redundancy mechanism is be performed by the first user equipment for a first data packet; and causing circuitry for causing the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment, and the apparatus may comprises: using circuitry for using the first set of replication rules to determine when at least one replication-based redundancy mechanism is be performed by the second user equipment for a second data packet; and causing circuitry for causing the second user equipment to perform the at least one replication-based redundancy mechanism for the second packet when it is determined that said at least one replication-based redundancy is to be performed.

The apparatus may comprise causing circuitry for causing signalling, to the network, an indication that the second user equipment is associated with the first replication handling function.

The apparatus may comprise: receiving circuitry for receiving, from the first user equipment, a bundle identifier for use in identifying linked sessions; and providing circuitry for providing the bundle identifier to the second user equipment for use in the second user equipment establishing a session.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a nineteenth aspect, there is provided an apparatus for a session management function, the apparatus comprising: receiving circuitry for receiving, from a first user equipment, a first request to establish a first data session for transmitting first data traffic; determining circuitry for determining, using at least one identifier comprised in the first request whether the first data session is linked or will be linked to a second data session for transmitting the first data traffic; and signalling circuitry for, in response to a positive determination, signalling, to a storage function and/or to the first user equipment, an indication of mapping information for the first data session Said mapping information to the first data session may comprise at least one of: a session identifier and/or an indication of a user plane entity selected for the first session.

The apparatus may comprise: receiving circuitry for receiving, from a user equipment, a second request to establish a further data session; determining that the further data session may be linked to the first data session; retrieving circuitry for in response to a positive determination, retrieving, from a storage function, mapping information indicating a first session and a user plane entity selected for the first session; selecting circuitry for selecting a same user plane entity for the first and further data sessions using the retrieved mapping; and providing circuitry for providing the user plane entity with information for mapping the first and further data sessions.

The apparatus may comprise retrieving circuitry for retrieving mapping information for the further session from the storage function.

The apparatus may comprise: receiving circuitry for receiving, from a policy and control function, a first set of replication rules to be applied by a replication handling function for the first and second sessions; and providing circuitry for providing the first set of replication rules to the replication handling function.

The apparatus may comprise: providing circuitry for providing the first set of replication rules to the replication handling function at the user equipment side and/or to the replication handling function at the network side.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

According to a twentieth aspect, there is provided an apparatus for a storage function located in a network, the apparatus comprising: receiving circuitry for receiving, from a network function, mapping information indicating a data session and a user plane entity selected for that session; storing circuitry for storing said mapping information; and providing circuitry for in response to a request from a network function, providing said mapping to the requesting network function or providing to the requesting network function an indication that no such mapping exists.

The network function may be a session management function.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

According to a twenty first aspect, there is provided non-transitory computer readable medium comprising program instructions for causing an apparatus for a network function to perform at least the following: receive an indication that a first user equipment and/or a first user plane function configured to transmit first user traffic is associated with a first replication handling function, the first replication handling function being configurable to coordinate at least one replication-based redundancy mechanism performed on at least part of said first user traffic; determine a first set of replication rules for use by the first replication handling function determining when the at least one replication-based redundancy mechanism is performed on at least part of said first user traffic; and cause the first set of replication rules to be provided to the first replication handling function.

The determining the set of replication rules may comprise determining the first set of replication rules using a rule selection policy that is common to said network function and another network function.

The apparatus may be caused to: identify a second replication handling function associated with at least one user plane function configured to receive at least part of said first user traffic and/or to transmit second user traffic to the first user equipment and/or to the first user plane function; determine a second set of replication rules for use by the second replication handling function when determining when to perform at least one replication-based redundancy mechanism on at least part of said second user traffic; and cause the second set of replication rules to be provided to the second replication handling function.

The apparatus may be caused to determine that the first user equipment is comprised in a same apparatus as a second user equipment and/or that the first user plane function is comprised in a same apparatus as a second user plane function.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a twenty second aspect, there is provided non-transitory computer readable medium comprising program instructions for causing an apparatus for first user equipment to perform at least the following: signal, to a network, an indication that the first user equipment is associated with a first replication handling function, the first replication handling function being configurable to coordinate at least one replication-based redundancy mechanism performed by the first user equipment on first user traffic; and receive, from the network in response to said signalling, a first set of replication rules for use by the replication handling function when determining when the at least one replication-based redundancy mechanism is performed by the first user equipment; and provide the first set of replication rules to the replication handling function.

The signalling the indication may comprise comprising said indication in a capability indication during registration of the user equipment with the network.

The apparatus may further be caused to: signal a first request to establish a first data session; receiving, from the network, a bundle identifier for identifying sessions linked to the first session in response to signalling the first request; and provide the bundle identifier to the replication handling function.

The apparatus may further be caused to: signal, to a network, a request to establish a second data session, wherein said request comprises the bundle identifier.

The apparatus may comprise the first user equipment, the replication handing function, and a second user equipment.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a twenty third aspect, there is provided non-transitory computer readable medium comprising program instructions for causing an apparatus for a first replication handling function associated with a first user equipment to perform at least the following: cause signalling, to a network, an indication that the first user equipment is associated with the first replication handling function, the first replication handling function being configurable to coordinate at least one replication-based redundancy mechanism performed by the first user equipment on first user traffic; and receive, from the at least one user equipment, a first set of replication rules.

The apparatus may be caused to: use the first set of replication rules to determine when at least one replication-based redundancy mechanism is be performed by the first user equipment for a first data packet; and cause the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment, and the apparatus may be caused to: use the first set of replication rules to determine when at least one replication-based redundancy mechanism is be performed by the second user equipment for a second data packet; and cause the second user equipment to perform the at least one replication-based redundancy mechanism for the second packet when it is determined that said at least one replication-based redundancy is to be performed.

The apparatus may be caused to cause signalling, to the network, an indication that the second user equipment is associated with the first replication handling function.

The apparatus may be caused to: receive, from the first user equipment, a bundle identifier for use in identifying linked sessions; and provide the bundle identifier to the second user equipment for use in the second user equipment establishing a session.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier According to a twenty fourth aspect, there is provided non-transitory computer readable medium comprising program instructions for causing an apparatus for a session management function to perform at least the following: receive, from a first user equipment, a first request to establish a first data session for transmitting first data traffic; determine, using at least one identifier comprised in the first request whether the first data session is linked or will be linked to a second data session for transmitting the first data traffic; and in response to a positive determination, signal, to a storage function and/or to the first user equipment, an indication of mapping information for the first data session Said mapping information to the first data session may comprise at least one of: a session identifier and/or an indication of a user plane entity selected for the first session.

The apparatus may be caused to: receive, from a user equipment, a second request to establish a further data session; determine that the further data session may be linked to the first data session; in response to a positive determination, retrieving, from a storage function, mapping information indicating a first session and a user plane entity selected for the first session; select a same user plane entity for the first and further data sessions using the retrieved mapping; and provide the user plane entity with information for mapping the first and further data sessions.

The apparatus may be caused to retrieve mapping information for the further session from the storage function.

The apparatus may be caused to: receive, from a policy and control function, a first set of replication rules to be applied by a replication handling function for the first and second sessions; and providing the first set of replication rules to the replication handling function.

The apparatus may be caused to: provide the first set of replication rules to the replication handling function at the user equipment side and/or to the replication handling function at the network side.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

According to a twenty fifth aspect, there is provided non-transitory computer readable medium comprising program instructions for causing an apparatus for a storage function located in a network to perform at least the following: receive, from a network function, mapping information indicating a data session and a user plane entity selected for that session; storing said mapping information; and in response to a request from a network function, provide said mapping to the requesting network function or providing to the requesting network function an indication that no such mapping exists.

The network function may be a session management function.

The mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between the session management function and the user plane entity.

The first set of replication rules may relate to how to establish the replication-based redundancy mechanism for selected user traffic, and may comprise at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Each replication rule in said set of replication rules may be associated with a respective identifier.

According to a twenty sixth aspect, there is provided a computer program product stored on a medium that may cause an apparatus to perform any method as described herein.

According to a twenty seventh aspect, there is provided an electronic device that may comprise apparatus as described herein.

According to a twenty eighth aspect, there is provided a chipset that may comprise an apparatus as described herein.

BRIEF DESCRIPTION OF FIGURES

Some examples, will now be described, merely by way of illustration only, with reference to the accompanying drawings in which:

FIGS. 1A and 1B show a schematic representation of a 5G system;

FIG. 5 shows a schematic representation of a network;

DETAILED DESCRIPTION

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

Figure 1A:
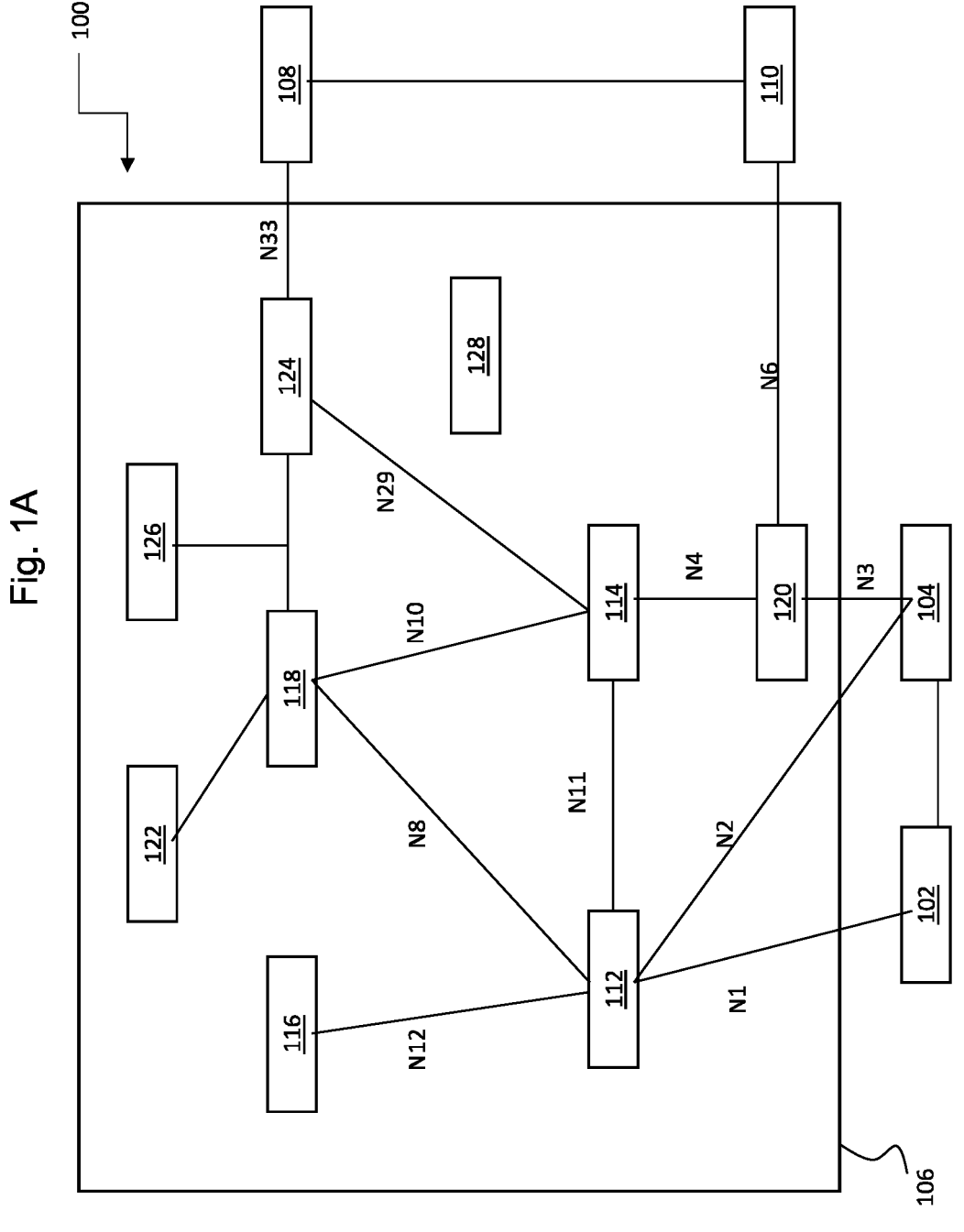

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

Figure 1B:
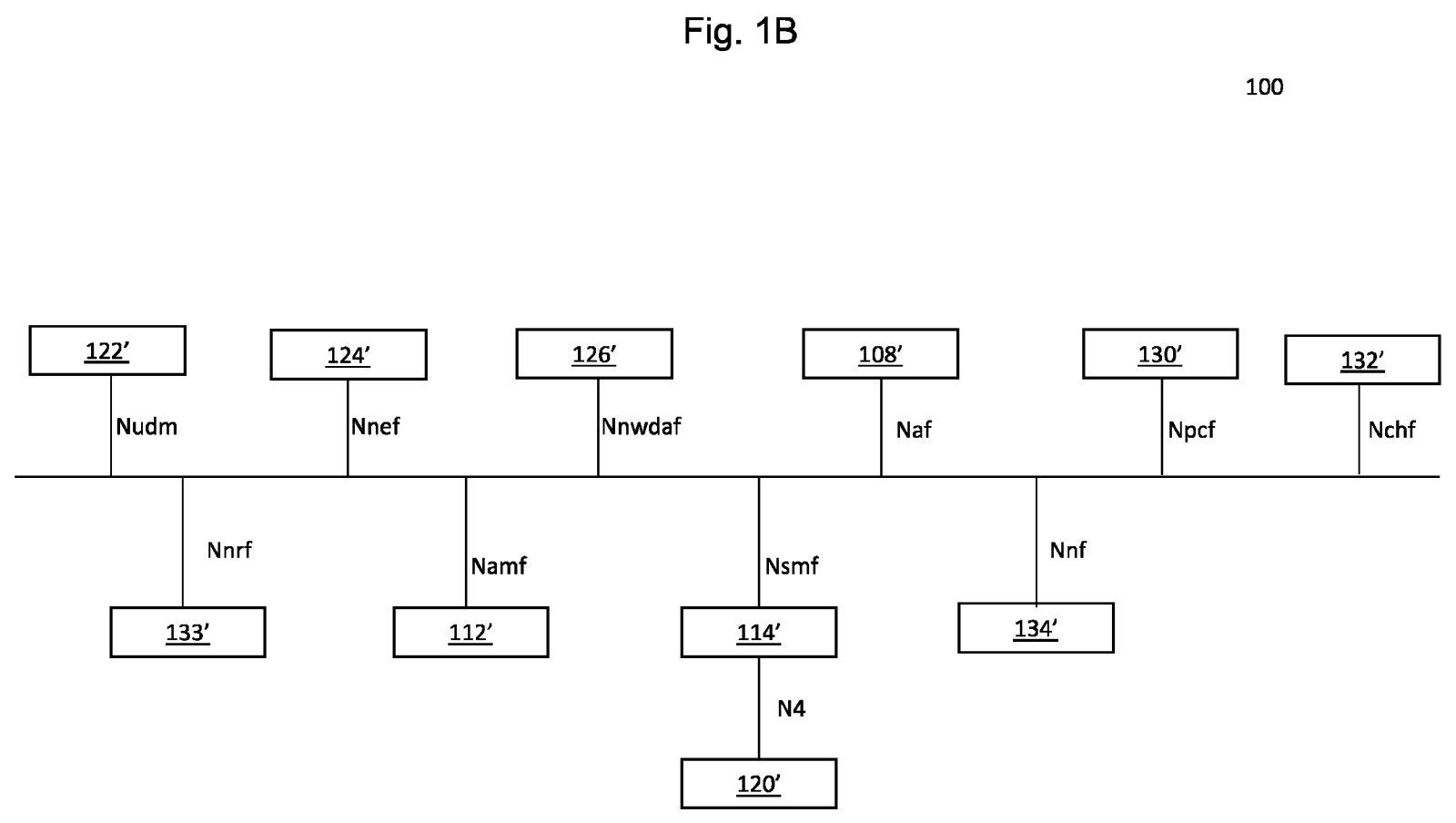

FIG. 1B shows a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP refers to a group of organizations that develop and release different standardized communication protocols. 3GPP develops and publishes documents pertaining to a system of "Releases" (e.g., Release 15, Release 16, and beyond).

The use of redundantly transmitting data by simultaneously transmitting the same data using multiple traffic paths across two communication end-points has been studied and used in 3GPP networks in order to provide both an enhanced reliability and lower latency. The use of transmitting different data using such multiple traffic paths has also been studied and used for use in providing an improved throughput.

3GPP Release 16 introduced has defined Ultra Reliable Low Latency Communication (URLLC) for delivering communications that have to be delivered reliably within a short timescale. URLLC communications may be, for example, smart factory/industrial automation, intelligent transportation, and entertainment and media streamlining.

However, URLLC has some limitations when applied to the transmission of traffic across different traffic paths.

For example, replication of traffic at the end-points is outside the control of the 5G System, and relies on an external mechanism to specify how the multiple paths are to be used for end-to-end delivery of redundant traffic. An example external mechanism is, for example, Frame Replication and Elimination for Reliability (FRER), as defined in the IEEE 802.1CB-2017 standard, which is applied for Time Sensitive Communication (TSC).

Further, URLLC mechanisms apply only to 3GPP access (e.g. the Next Generation (NG) Radio Access Network (RAN)). This means that they cannot take advantage of situations in which multiple types of access technologies are used to provide data/traffic back to another entity.

Further, URLLC techniques do not guarantee end-to-end redundancy under the full control of the network operator.

3GPP has specified mechanisms for improving reliability as part of 5G URLLC work. These specified mechanisms include mechanisms supporting redundant PDU Sessions, dual connectivity, dual N3/General packet radio services Tunnelling Protocol for user plane data (GTP-U) tunnel, etc.

Some of the use cases currently defined in 3GPP use URLLC in the sense that at least one UE may be configured to use an arbitrary number of 3GPP and non-3GPP access legs for transmitting data. For example, in future Railway systems, a train may have connectivity to both New Radio and Long Term Evolution and/or Wireless Local Area Network (WLAN) in parallel in order to ensure that critical information can be successfully exchanged. In such scenarios, mechanisms supporting ultra-high reliability managed by the network operator would be needed.

At least two scenarios for helping to ensure this need further specific supporting mechanisms for this.

A first example scenario relates to when there are multiple packet data unit (PDU) sessions for a single UE using single registration in the network, where the UE is simultaneously connected to different access networks. In this case, the PDU sessions are assumed to converge in the same end-point, e.g., a user plane function.

As a second example scenario, multiple UEs each establish a single respective packet data unit session potentially different UPFs, where these PDU sessions are correlated and used for, for example, traffic duplication. This assumes that an ultra-reliable low latency communication (URLLC) application is allowed to use the multiple UEs and PDU sessions to distribute uplink traffic while an application server uses the multiple PDU sessions to distribute the downlink traffic accordingly.

In addition to these, it is understood that the cases of a single user plane function and/or multiple user plane functions may be supported.

The simplest way to implement such multipath features is to use an application-level controlled multipath transmission over multiple interfaces at both ends (e.g., via multi path Transport Control Protocol (TCP)). However, as this approach is outside the network layer, it requires that both end points are properly configured for the concurrent use of the multiple interfaces, and does not utilise any knowledge of the underlying network. This may result in an inefficient use of the network architecture.

3GPP attempted to address some of the problems associated with URLLC mechanisms in Technical Report 23.725. This Technical Report introduced a Replication Handling Function (RHF) for use in at least one of a single UE case and in and dual UE cases. However, this document did not address the problem on how the UE(s) knows whether to establish a redundant PDU Session by itself, or whether another UE will establish a redundant PDU Session for transmitting replicated data. Essentially, the establishment and management of replication/elimination and the protocol enablers for replication/elimination has not been addressed.

URLLC-related Release 17 extensions on System enhancement for redundant PDU session have enabled the Next Generation-RAN to become aware of redundant sessions so that the RAN may select different Master node/Secondary node combinations for efficiently using network resources. However, similar issues to those mentioned above still exist in such a system.

Access traffic Steering, Switching and Splitting (ATSSS) is a 3GPP-defined mechanism that aims to provide a more efficient use of 3GPP and non-3GPP accesses for specific applications. For example, ATSSS relates to Traffic Steering (i.e., selecting an access network for a new data flow), Traffic Switching (i.e., moving all traffic of an ongoing data flow from one access network to another preserving continuity), and Traffic Splitting (i.e., splitting traffic of a data flow across two access networks).

However, Access traffic Steering, Switching and Splitting has several disadvantages. These include, for example, issues relating to reliably transmitting data (which has not been addressed at all in current ATSSS specifications), and that only certain configurations with a single 3GPP access and a single non-3GPP access for a single UE has been considered.

The following proposes mechanisms for enabling the 3GPP system to perform traffic replication at an ingress of user plane traffic and traffic elimination at an egress of user plane traffic, as well as for enabling a network operator to dynamically control the replication and/or elimination of traffic for each application by respectively updating replication and/or elimination rules. In the present context, what would be considered an ingress and an egress may depend on the direction of traffic. For example, for downlink user plane traffic, a user plane function may be an ingress of user plane traffic while a UE provides an egress of user plane traffic. Further, for uplink user plane traffic, a UE may provide an ingress of user plane traffic while a user plane function provides an egress of user plane traffic.

In particular, the following proposes an RHF that analyzes a first packet based on RHF Rules to determine whether it should be routed over multiple UE(s) with duplicated PDU Sessions. When the packet is to be routed, the RHF may then determine via which UEs the packet it to be routed. The UE(s) may then schedule either a single PDU session or two PDU sessions depending on the determination by the RHF. The RHF generates duplicate traffic as per TS23.501 (i.e., UE Route Selection Policy is used to establish two redundant PDU Sessions; duplicated traffic from the application, associated to the redundant PDU Sessions, is differentiated by two distinct traffic descriptors). The UE does not need to understand that the traffic is a duplicate data packet as this is determined transparently to the UEs.

In more detail, the following relates to a duplication of user plane traffic over PDU sessions established for the purpose. At least some of the traffic via the involved UE(s) may be either duplicated or not duplicated. The RHF may generate duplicated traffic as described in 3GPP TS23.501. For example, UE Route Selection Policy may be used to establish two redundant PDU Sessions, and duplicated traffic from the application, associated to the redundant PDU Sessions, may be differentiated by two distinct traffic descriptors. At the replication and/or elimination occurs at an RHF, the UE does not need to understand that the traffic comprises a duplicated packet.

There is thus provided a system in which PDU Sessions may be established by a single UE hosted by a single device or by multiple UE(s) that are hosted by a single device (i.e., collocated in the same device), allowing the device to independently connect to different 3GPP networks or to the same network via the two UEs. Each PDU Session may have a respective SMF and/or PCF associated therewith. However, it is understood that a single SMF and/or PCF may be used for multiple of the PDU sessions being considered.

The following further provides a replication handling function (RHF) that may be located in the network and an RHF at an apparatus comprising at least one UE (e.g., collocated at the single device mentioned in the preceding paragraph).

For the RHF located on the network-side, the RHF may be embodied as a function collocated with a UPF and controlled by the SMF via an N4 interface, and/or embodied as a standalone function on an N6 interface with a UPF, where the standalone RHF function is controlled by SMF via a N4-like interface (labelled as N4* in the below example).

The RHF on the UE side and/or the network side may be mainly focused on replicating and eliminating traffic, but may also steer, switch, split traffic as defined within Access traffic Steering, Switching and Splitting rules. This may use, for example, Multi-party Transport Control Protocol and/or Multi-party QUIC (QUIC is a protocol defined by the Internet Engineering Task Force (IETF) that operates at the transport layer).

During registration of the UE with the network, the UE may signal an indication of whether the UE supports RHF. In other words the UE may signal a first indication when the UE supports RHF and the UE may signal a second indication when the UE does not support RHF. The relevant indication may be provided, for example, via a UE state indication. When the UE indicates that it does support an RHF, the relevant indication may be provided by comprising additional information in a capability information element that identifies a unique mapping of the UE to the RHF within the apparatus.

The apparatus comprising the UE may comprise information provisioned thereto as part of a new container comprising RHF rules. The container may be considered as representing a bundle of information, such as RHF rules. The container may be considered an information element. The RHF function may generate and route the packets to the respective UE(s) and PDU Sessions according to the RHF Rules. As an RHF rule controls how traffic is delivered to the PDU sessions, the RHF rule may be considered as operating above the UE Route Selection Policy (URSP) rules, whereas Access traffic Steering, Switching and Splitting rules operate on the traffic of an Multi Access PDU session.

An RHF Rule may comprise a traffic descriptor to identify the traffic for which the redundancy is to be applied and/or to identify the applications for which redundancy is being applied. An RHF Rule may identify at least one redundancy option for replicating the traffic. Example redundancy options include, for example, a number of links to use when transmitting the traffic being duplicated, an access technology type to use, and/or a network identifier that identifies a network to use (and/or to not use). The RHF rule may further identify failure handling rules, which provides rules to follow when the traffic being duplicated is not received correctly.

The RHF rules may be transparently delivered to the RHF by the UE(s).

RHF rules may be provisioned to RHF end-points via Session Management signalling (e.g., to UE(s)) and/or N4 interfaces (e.g., to user plane function(s)). In case traffic replication is going to be used, the rule contains also an indication that the PDU session is used as a redundant PDU session. The indication can be of any form. RHF Rules may additionally or alternatively be provisioned within a separate container in the signalling to the UE comprising existing rules (e.g., such as UE Route Selection Policy Rules). The container may also comprise an address of the standalone RHF and/or of the common UPF, depending on the architecture option.

The at least one RHF rules may be provisioned at an RHF by different PCFs. Therefore, PCFs may be configured with compatible RHF rules. To avoid issues with conflicting RHF rules, the network may be configured in at least one of a plurality of different ways. For example, RHF Rule prioritization procedures may be provisioned at an RHF for determining which of the received rules to apply when the received rules conflict. The RHF rules may be prioritized in any of a plurality of different ways. For example, one option is to configure an RHF to use a set of non-conflicting RHF rules that have been received the most recently. Any RHF Rule that conflicts with a previously received RHF Rule may thus override that previously received RHF Rule. Another example way of avoiding conflicting rules to configure different PCFs to use exactly the same rule definition logic. It is understood that these are example options for avoiding simultaneous employment of conflicting RHF rules, and that other options for avoiding RHF rule conflicts are also possible. Similarly, RHF rules may be configured to not conflict with UE Route Selection Policies using the same or similar mechanisms.

At least some of the apparatus described herein may be configured to identify sessions that are linked together, and ensure selection of a common endpoint. This may be performed using at least one of two different mechanisms.

In a first mechanism, a network function (e.g., a UDM, a UDR, a binding support function (BSF), and/or any other NF) may be configured to store "session bundling" information. The session bundling information may comprise a bundle identifier (which may serve as a database key) that identifies information corresponding to linked sessions.

The session bundling information may enable the network to serve the linked PDU Sessions by a common UPF comprising a RHF (as illustrated in in the below architecture of FIGS. 6 and/or 7), and/or by a common RHF (as illustrated in in the below architecture of FIGS. 8 and/or 9). An identification of the UEs and PDU Sessions that are linked together may therefore be used for redundancy. Different SMF(s) may be configured to use a same UPF and/or RHF to serve the linked PDU Sessions. Further, the UPF may be configured to know how the N4/N4* sessions are associated to potentially different SMFs that correspond to linked PDU sessions.

In a second mechanism, the bundling information being provided may be integrated in an RHF rules container and provisioned to the RHF at the UE-side. The RHF may read the information and use it for determining when traffic is to be replicated. The RHF may provide the information to a UE. The UE may comprise the bundling information at the establishment of each of the PDU sessions. The network entity (e.g. the SMF) receiving the bundling information from the UE may thus be made aware of all the bundling information without retrieving it from another network function. New PDU sessions may be established/associated for the duplicated traffic. In other words, the duplicated traffic may be signalled for a different PDU session to the PDU session used for the signalling of the original traffic.

A user plane entity (e.g. the network RHF end-point) receiving the bundling information from the UE may thus be made aware of all the bundling information without retrieving it from another network function. The user plane entity may use this information for ensuring the successful bundling of the sessions in a way that is transparent to the involved UEs and UP entities and understood by the RHFs at the end-points. The bundling information may be only understood by the RHFs at the end-points.

Bundling information for indicating linked PDU sessions (such as, for example, the bundle identifier), may be provided to the RHF located at the UE-side within a network-provided RHF rules container. This bundling information may be first received by the UE, before being passed transparently from the UE to the RHF associated therewith. Where the device comprises multiple user equipment, the RHF associated with the UE may pass the bundling information to another UE located in that same device. That other UE may subsequently pass the bundling information to the network during PDU session establishment. The other UE may not understand the contents of the provided bundling information.

For the architectures of FIGS. 6 and 7 (see below) and for all of the above-mentioned mechanisms, as different PDU Sessions are terminated at the same UPF, N4 signalling may be used to allow a UPF to stitch (i.e., bundle) corresponding N4 (PDU) Sessions together. For doing that the network may allocate a Stitching identifier to all PDU Sessions that belong together. The stitching identifier may or may not be the same as the Bundle identifier.

For this purpose, certain bundling information is stored in the network (such as, for example, at the Unified Data Management Function and/or the Unified Data Repository). This bundling information may indicate i) which N4 sessions are related as they correspond to correlated (redundant) PDU sessions, and/or ii) information for ensuring that the same user plane entity is selected for correlated PDU sessions.

The bundling information may be provided in any of a plurality of different forms. For the purpose of example only, an example form of the bundling information is provided in Table 1.

As can be seen from this Table, the bundling information may comprise an identifier for the bundling information (represented as "Bundle ID"). The bundle ID may be a unique identifier for the bundling information.

The bundling information may further comprise information for identifying bundled N4 sessions that are linked/related. For example, the bundling information may comprise PDU session identifiers. An N4 interface interfaces between a user plane function and a session management function.

The bundling information may comprise information for identifying which N4 sessions are inked/related. For example, the bundling information may comprise N4 session identifiers.

The bundling information may comprise information relating to a single user plane entity associated to those bundled sessions. For example, the bundling information may comprise an address for the user plane entity, a type and/or an instance Identifier of the user plane entity, etc.

TABLE 1

| Example format for bundling information |
| --- |
| Bundle ID |
| PDU session IDs (the info needed to identify the bundled N4 sessions are linked/related) |
| N4 Session IDs (the info needed to identify which N4 sessions are linked/related) |
| UP entity info (including address, type, instance Identifier etc) |

The bundling information may be used by any network function (NF), and at least part of the bundling information may be provisioned to the UE.

The Bundle ID may be determined by the User Plane instance serving the bundled data sessions The RHF may be configured with rules for determining the duplication details. These rules may relate to, for example, a number of PDU sessions to be used, and may be provisioned to the device side in any of a plurality of different ways (e.g., as part of UE Route Selection Policy rules and/or in a new transparent container (e.g., a new information element)). The UEs do not need to understand the RHF rules, which are transparently delivered to the RHF.

The RHF at the UE-side may be considered a function sitting in a device that comprises at least one (and may comprise multiple UEs). A "UE" may be considered the device part communicating with the network, where the RHF may be a separated software deployed on the device and interfacing with the UE part via application programming interfaces. The RHF may thus be considered as logical function within a device that comprises the one or more UE.

In some examples, at least part of the bundling information may be integrated in an RHF rules container (e.g., in an RHF rules information element). The bundling information may be provided to a device comprising the RHF during a first provisioning step, used by the RHF, and provided back to the network at the establishment of each of the PDU sessions. This enables the bundling of the PDU sessions in a way that is transparent to the involved UEs and User plane entities, and understood only by the RHFs at the end-points and potentially some Network Functions (e.g. SMF).

Throughout the following, the terms "linked" UEs/PDU sessions and "bundled" UEs/PDU sessions are used to refer to UEs and/or PDU sessions that may receive/handle the same traffic (i.e. duplicated traffic). Similarly, the terms "linked" user plane entities/N4 sessions and "bundled" user plane entities/N4 sessions are used to refer to user plane entities and/or N4 sessions that may receive/handle the same traffic (i.e. duplicated traffic).

To assist in understanding the present disclosure, the following provides an overview of different deployment scenarios and architecture options that may perform elements of the present disclosure, with respect to FIGS. 6 to 9.

The following provides more detailed information on how the present disclosure may be applied to the different architectures of FIGS. 6 to 9.

In general, a device may host one or multiple UE(s) subscribed to the same Home network (e.g. to a same home-public landline mobile network (PLMN) and/or to a same Standalone Non-Public Network (SNPN)), possibly using different serving networks and any Radio Access Technology. Although only up to two UEs are depicted in the examples of FIGS. 6 to 9, it is understood that the number of supported UEs in a linked session may be more than two.

It is noted that although the below examples of FIGS. 6 to 9 show two traffic legs and up to two UEs, the principles described herein may be applied to cases in which there are more than two traffic legs and/or UEs. In addition, those examples in which the second RHF is shown as being collocated with a UPF can be generalized to a case in which the second RHF and the user plane function are located separately from each other.

Further, for brevity and simplicity, the following provides examples in the context of single access PDU sessions. However, it is understood that the presently provided principles may also be applied in those cases in which a UE establishes a multi-access PDU session as a multi-access PDU session may still be considered to be a PDU session from RHF perspective.

Figure 6:
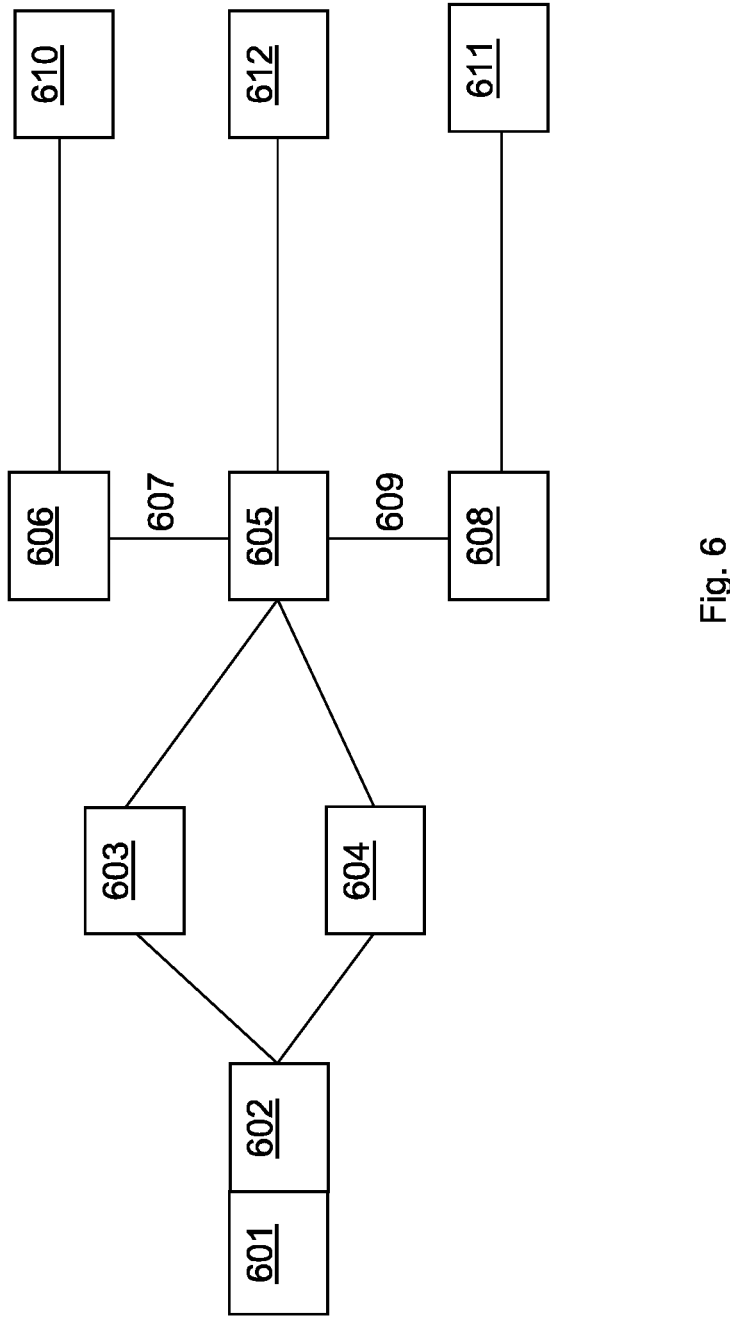
FIGS. 6 to 9 show schematic representations of example networks.

FIG. 6 is a schematic illustration of a first deployment scenario and architecture.

FIG. 6 shows a first RHF 601 associated with a UE 602. The UE 602 is configured to access a network through at least a first access node 603 and a second access node 604. The first access node 603 and the second access node are both configured to route traffic for the UE 602 to a user plane function 605 comprising a second RHF (not shown). The user plane function 605 may be configured to communicate with a first SMF 606 over a first N4 interface 607. The user plane function 605 may be configured to communicate with a second SMF 608 over a second N4 interface 609. The first SMF 606 is associated with a first UDR 610 and the second SMF 608 is associated with a second UDR 611. The user plane function 605 may be configured to communicate with a data network 612.

This first example architecture relates to a case in which a single UE 602 has two PDU Sessions anchored at the same PSA UPF 605 with a so-called replication and elimination function or Replication Handling Function (RHF) supported by the UPF. The first and second SMFs 606, 608 serve respective ones of the two PDU sessions. A PSA UPF is a UPF that terminates an N6 interface of a PDU session within a 5G core network, where an N6 interface is an interface between a UPF and any other external (or internal) network or service platform, such as the Internet, the public cloud or private clouds. There may be any number of intermediate UPF(s) between the access nodes 603/604 and the PSA UPF 605. These intermediate UPF(s) are not depicted or mentioned in the description as the mechanism being described is totally transparent to them.

Figure 7A:
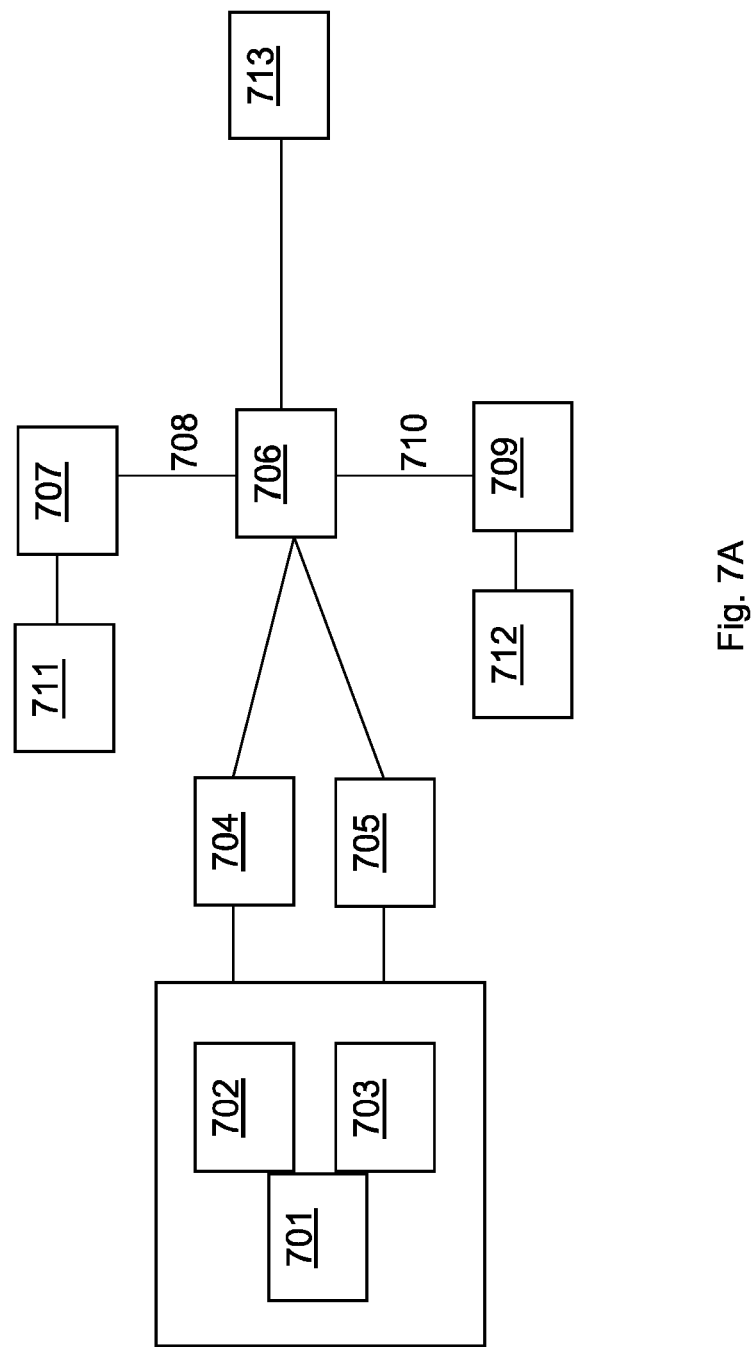

FIG. 7A is a schematic illustration of a second deployment scenario and architecture.

FIG. 7A illustrates a first replication handling function 701 associated with both a first UE 702 and a second UE 703. Both of the first and second UEs may be comprised as part of a same device/apparatus that further hosts the first RHF 701. This device may be, for example, a robot, an industrial or any other device running applications with very high reliability requirement. The first and second UEs 702, 703 are configured to access a network through at least one of a first access node 704 and a second access node 705. The first and second access nodes 704, 705 may be configured to route traffic for the UEs 702, 703 to a user plane function 706 that comprises a second RHF (not shown). The user plane function 706 may be configured to communicate with a first SMF 707 over a first N4 interface 708. The user plane function 706 may be configured to communicate with a second SMF 709 over a second N4 interface 710. The first SMF 707 is associated with a first UDR 711 and the second SMF 709 is associated with a second UDR 712. The user plane function 706 may be configured to communicate with a data network 713. There may be any number of intermediate UPF(s) between the access nodes 703/704 and the PSA UPF 706. These intermediate UPF(s) are not depicted or mentioned in the description as the mechanism being described is totally transparent to them.

This second example architecture relates to a case in which two UEs 702, 703 each having a respective PDU Session, where both PDU Sessions are anchored at the same PSA UPF 706 with replication and elimination function supported by the UPF 706.

In the first and second example architecture, traffic of different SA (Single Access) PDU Sessions (of one or multiple UEs) is converged on a single UP function (UPF) that comprises an RHF. The first and second RHFs are responsible for traffic replication at the ingress and traffic elimination (i.e., elimination of duplicated packets/frames) at the egress.

The following provides example operations that may be performed in both of the examples of FIGS. 6 and 7A. These example operations are discussed in the context of FIG. 7B, which further shows duplicated traffic being routed through a common user plane entity in the network.

Figure 7B:
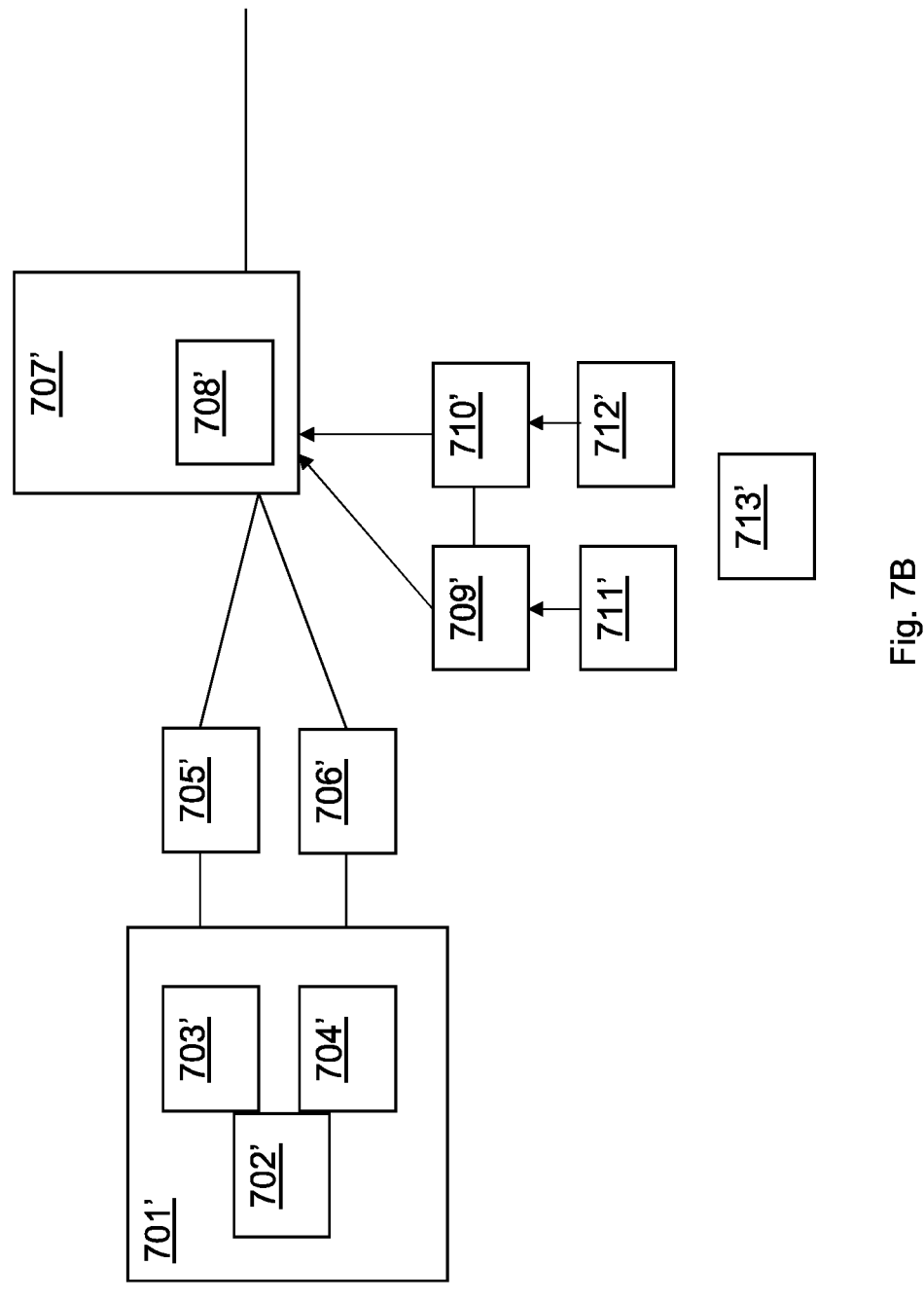

FIG. 7B illustrates a device 701' comprising a first RHF 702', a first UE 703' and a second UE 704'. The first and second UEs 703', 704' are both associated with the first RHF

702'. The first UE 703' is configured to route user traffic to and from a user plane function 707' comprising a second RHF 708' via a first access network 705' and via a second access network 706'. The first UE 703' is configured to route user traffic to and from the first RHF 702', and to route control traffic to the first RHF 702'. The second UE 704' is configured to route user traffic to and from the user plane function 707' via the second access network 706'. The second UE 704' is configured to route user traffic to and from the first RHF 702', and to route control traffic to the first RHF 702'. The second RHF 708' is configured to receive control plane traffic from a first SMF 709' and a second SMF 710'. This control signalling to the second RHF 708' from the first and second SMFs may be received via respective N4 interfaces. There may be any number of intermediate UPF(s) between the access nodes 705'/706' and the PSA UPF 708'. These intermediate UPF(s) are not depicted or mentioned in the description as the mechanism being described is totally transparent to them.

The first SMF 709' is shown as providing control signalling to both the first UE 703' and the first RHF 702'. The first SMF 709' is configured to receive control signalling from a first PCF 711'. This signalling may be received via a first N7 interface. The second SMF 710' is configured to receive control signalling from a second PCF 712'. This signalling may be received via a second N7 interface. Also shown in FIG. 7B is a Unified Data Management Entity 713'.

In this example of FIG. 7B, the first UE 703' has two PDU sessions established and the second UE has a single PDU session established. These three sessions are bundled (linked) together.

In this example of FIG. 7B, at the time of registration, the first and second UEs may indicate support of RHF. This may be performed by, for example, signalling, for each of the first and second UEs, at UE state indication. This signalling may further comprise additional information for a unique mapping of the first and/or second UE to the first RHF 702'.

Subsequent to this registration, the network (e.g., the PCF) configures UE Route Selection Policy rules in the UE(s) for when to establish redundant PDU Session(s) for a given Data Network Name and/or S-NSSAI, and/or Application identifier, etc. The UE Route Selection Policies may be such that either a different radio access technology is used for each PDU session, or an RSN/PDU Session Pair ID is included in a provided UE Route Selection Policy (as currently specified in 3GPP work item TEI17_SE_RPS).

Subsequent to this UE route selection rules configuration, each of the first and second UEs may establish their own respective PDU Session(s) for URLLC. This may be achieved by, for example, providing a data network name and/or a S-NSSAI to an SMF during a registration procedure. The SMF may optionally be provided with an RSN/PDU Session Pair identifier, and/or another indication such as a Bundle identifier if available (as indicated by the UE Route Selection Policy rules) during the registration procedure.

For the first established PDU Session of a potential bundle of sessions belonging together, the SMF handling that session stores the session bundling information for the session in another network function (e.g., in a UDM, a UDR, in a BSF, and/or in some other network function).

The session bundling information may comprise a plurality of different information. For example, the session bundling information may comprise an identifier and/or address for a user plane entity selected for this session. As another example, the session bundling information may comprise a bundle identifier allocated by this user plane entity. As another example, the bundling information may comprise a session identifier for the interface between the SMF and the user plane entity (e.g., an N4 or N4* identifier, depending on whether the identifier is provided to the SMF from a user plane function or from an NHF). The bundling information may be provided to the SMF via an N4 interface. The SMF may subsequently signal an indication of the linked PDU Session to a PCF. This may be effected using a single N7 instance per PDU session, but providing information linking these N7 instances together, such as a common identifier unique to that set of bundled PDU sessions. This may allow the PCF to consider a bundle of PDU Sessions as a linked set.

For the next PDU Session in the bundle, any other SMF may retrieve the session bundling information from UDM/UDR. The SMF may determine whether a PDU session is a linked PDU Session based on the Data Network Name and/or the S-NSSAI, and/or based on any other indication received from UE (such as the bundle identifier). In certain scenarios (e.g., where there is a single UE having multiple PDU sessions), the linkage between PDU sessions may be identified based on a provided PDU Session Pair ID. The UDM/UDR may provide the SMF with an identifier and/or address for the user plane entity associated with that bundle of PDU sessions. The other SMF may use the provided user plane entity identifier/address to select that user plane entity for the session.

The SMF(s) may link the different PDU/N4(') Sessions at the user plane entity by the bundle identifier received as part of session bundling information. As mentioned above, the bundle identifier may have been provided over to the SMF from the user plane entity over an interface (e.g., an N4 or N4* interface) while the first PDU session of the first UE is being established.

The SMF(s) may send RHF rules to the UE via session management signalling. The SMF(s) may send RHF rules to the user plane function via N4 and/or N4* signalling. RHF rules are rules that apply to PDU sessions comprising the PDU session bundle. Each RHF rule may be identified by a respective Rule identifier. The Rule identifier may be stored in the network. The RHF rules sent to the user plane entity may be similar to Access traffic Steering, Switching and Splitting related N4 rules, but further comprising a redundancy indication and an indication of multiple PDU Sessions. The RHF rules sent to the user equipment may be similar to Access traffic Steering, Switching and Splitting related session management rules, but further comprising a redundancy indication and an indication of multiple PDU Sessions. These RHF rules may be locally configured at the SMF. These RHF rules may be provided to the UE and/or the user plane entity by a PCF via policy and charging control (PCC) rules.

The PCF may determine which RHF rules are valid for a particular PDU session bundle, and send the RHF rules to the SMF over each N7 interface associated with SMFs serving the particular PDU session bundle.

An SMF receiving the RHF rules may subsequently send, to each RHF via the UEs associated to the bundled PDU Sessions served by the SMF, the received RHF rules that are valid for the bundle. As RHF rules terminate in the RHF part of the device, the first and second UEs do not have to read and/or interpret any RHF rules they receive. Instead, the first and second UEs may simply forward any received RHF rules received to the RHF 702.

The SMF may signal reports about the individual PDU Sessions. These reports may be, for example, PCRT reports. The SMF may signal these reports to a PCF. The SMF may signal a report to the PCF when a predetermined event has occurred. For example, a report may be signalled from the SMF to the PCF when the SMF has determined that at least one of the following has occurred: a change in access type, and/or a change in location of the device, and/or a change in administrative domain for the session (e.g., a change in the public land mobile network associated with at least one session being considered).

The same PSA user plane function anchor for the multiple PDU sessions may be selected in alternative way to that discussed above. For example, instead of storing session bundling information in a UDR, the session bundling information may instead be provisioned directly to the device.

In this example, session bundling information may be only sent by an SMF that establishes the first PDU session in the bundle. This session bundling information may indicate, to a UE, that the first PDU session will form part of a PDU session bundle. The SMF may determine that the first PDU session will form part of a PDU session bundle by applying predetermined rules (e.g., potential use of the PDU session currently being established for applications requiring a high reliability). This session bundling information may be provided as part of session management signalling. For example, this session bundling information may be provided in a PDU session accept message when the first PDU session is being established. The UE may forward the received bundling information to the RHF.

When a UE establishes another PDU Session as part of the bundle, the UE may provide the received session bundling information to the SMF. This UE may be same UE that requested the first session establishment, or may be another UE located in the same device as the UE that established the first session. In case of multiple UEs, the second UE has received the necessary Bundling info from RHF in a container that is transparent to the UE.

The SMF may use the provided information to select the same PSA user plane function/RHF for the PDU Session being established. Session bundling information may further be integrity protected (e.g., be signed) by the network to help deter a UE from altering it. The SMF may check the integrity of session bundling information received from a UE prior to bundling sessions together.

Figure 8:
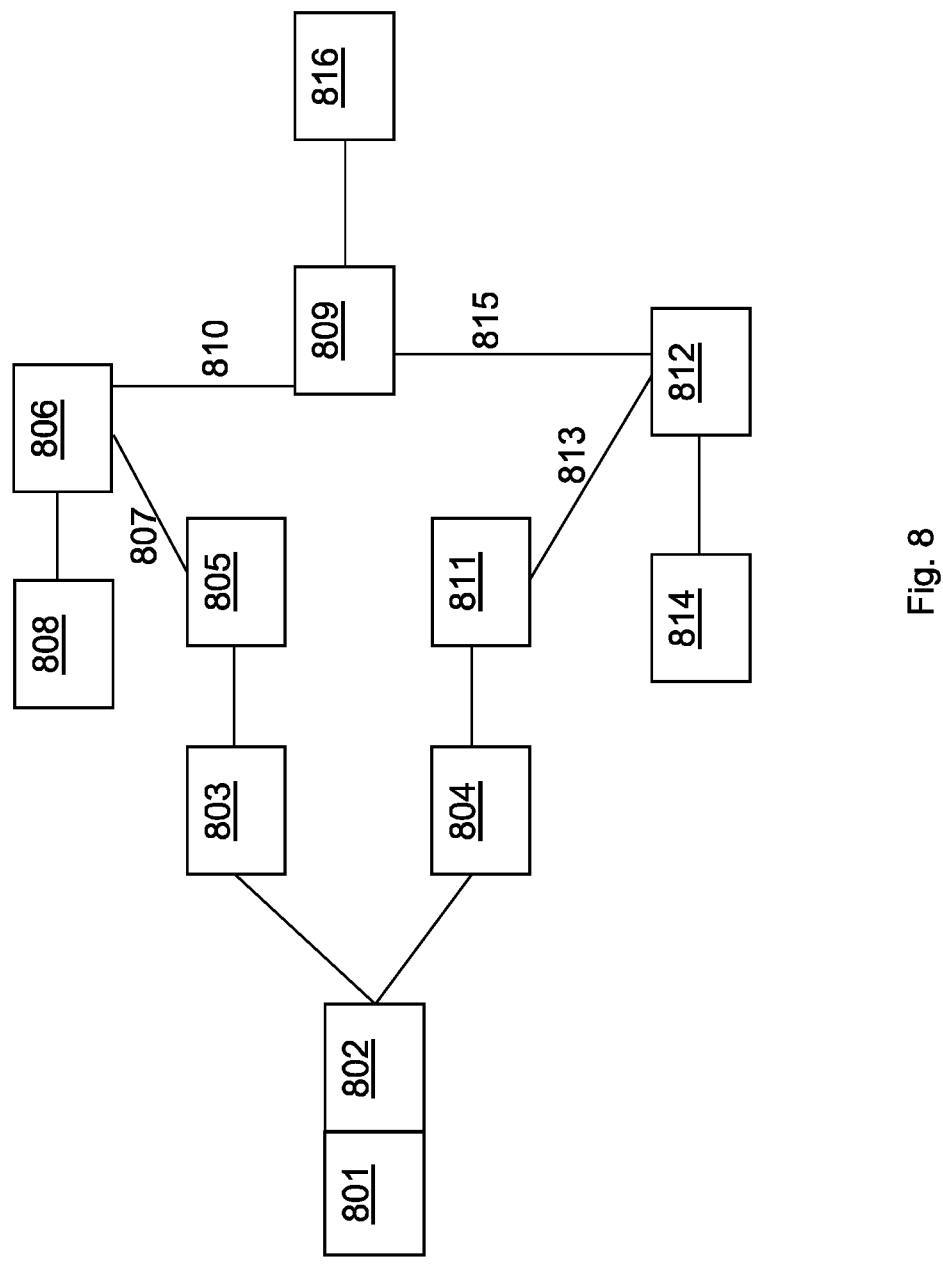

FIG. 8 is a schematic illustration of a third deployment scenario and architecture.

FIG. 8 shows a first RHF 801 associated with a UE 802. The UE 802 is configured to access a network through at least a first access node 803 and a second access node 804. The first access node 803 is configured to route user traffic for the UE 802 to a first user plane function 805. The first user plane function 805 is configured to communicate with a first session management function 806 over a first N4 interface 807. The first session management function 806 is configured to interact with a first UDR 808 and with a second RHF 809 over an N4* interface 810, where an N4* is a modified N4 interface (modified as described in more detail herein). As mentioned above, an N4 interface is an interface between an SMF and a UPF. An N4* interface may be considered to be an interface between an SMF and an RHF associated with a UPF. This N4* interface may be useful where the RHF associated with an SMF is external to the UPF. The second access node 804 is configured to route user traffic for the UE 802 to a second user plane function 811. The second user plane function 811 is configured to communicate with a second session management function 812 over a second N4 interface 813. The second session management function 812 is configured to interact with a second UDR 814 and with the second RHF 809 over an N4* interface 815. The second RHF 809 is configured to communicate with both the first and second user plane functions 805, 810. The second RHF 809 is configured to communicate with a data network 816.

In this third example architecture, there is shown a single UE 802 having at least two PDU Sessions anchored at different UPFs 805, 810, and with an external single replication and elimination function provided by RHF 809.

In this third example architecture the UE 802 may signal its capability to support RHF rules as described above in relation to FIG. 7B.

Further, as described above, the network may configured UE Route Selection Policy rules in the UE to provide the rules on when to establish redundant PDU Sessions for a given data network name and/or S-NSSAI, Application identifier ID, etc.

The UE of FIG. 8 may initiate a PDU Session establishment by signalling a request for this establishment to a SMF 812. The request may comprise a data network name, and/or S-NSSAI. The request may optionally comprise an RSN/ PDU Session Pair identifier when this information is available to the UE 802.

Based on the information comprised in the received session establishment request, the SMF 812 may select a user plane function and an RHF on the network side for the UE. Upon establishment of N4 and/or N4* session, the SMF 812 may store an identifier for the N4/N4* session, and/or an RHF address. This information may be stored in a network function such as, for example, a UDR, and/or a BSF. The SMF may additionally or alternatively provide the RHF address to the UE via session management signalling (e.g., non access stratum signalling). For example, this RHF address may be provided to the UE from the SMF using a PDU Session establishment accept message.

When the UE initiates a second PDU Session establishment (e.g., by signalling a second PDU session request to the SMF), the SMF may select a different user plane function to the first user plane function selected for the first PDU session request, while also selecting the same RHF as the RHF selected for the first PDU session request. The SMF may use the Data Network name and/or the S-NSSAI to select the same RHF. When the UE provides the same RHF address to the SMF as part of second PDU Session request, then the SMF may use the RHF address provided by the UE. When the UE does not provide the SMF with an RHF address, the SMF may retrieve an identifier for N4* session and/or the RHF address from UDM/UDR and/or from the BSF.

The RHF rules may be provisioned to the device comprising the first RHF 801 and the UR 802, and to the second RHF as described above in relation to FIG. 7B.

Figure 9:
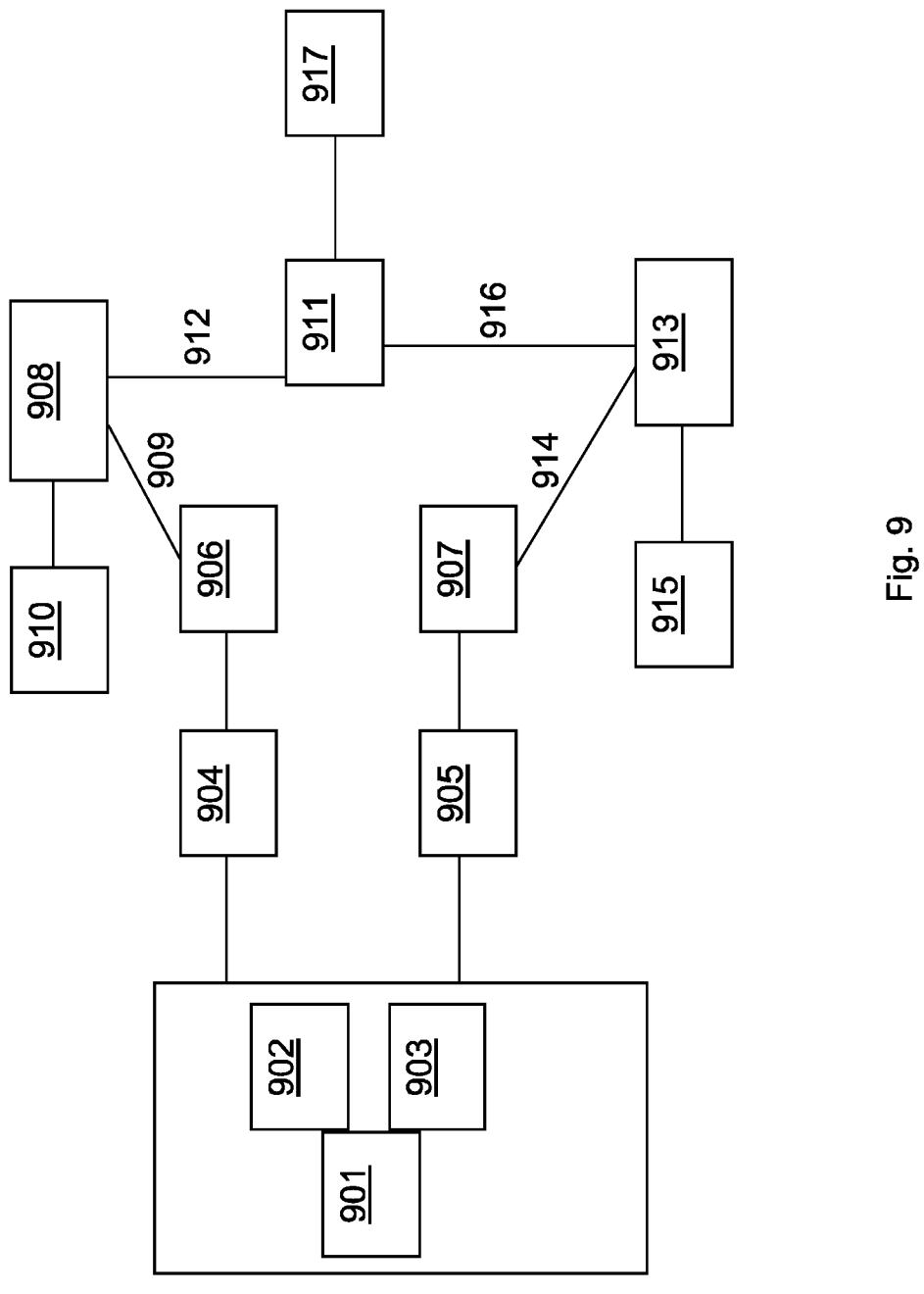

FIG. 9 is a schematic illustration of a fourth deployment scenario and architecture.

FIG. 9 illustrates a first replication handling function 901 associated with both a first UE 902 and a second UE 903. Both of the first and second UEs may be comprised as part of a same device/apparatus that further hosts the first RHF 901. This device may be, for example, a robot, an industrial or any other device running applications with very high reliability requirement. The first and second UEs 902, 903 are configured to access a network through at least one of a first access node 904 and a second access node 905. The first and second access nodes 904, 905 may be configured to route traffic for the UEs 902, 903 to respective first and second user plane functions 906, 907. The first user plane function 906 is configured to communicate with a first session management function 908 over a first N4 interface 909. The first session management function 908 is configured to interact with a first UDR 910 and with a second RHF 911 over an N4* interface 912. The second user plane function 907 is configured to communicate with a second session management function 913 over a second N4 interface 914. The second session management function 913 is configured to interact with a second UDR 915 and with a second RHF 910 over an N4* interface 916. The RHF 910 is configured to terminate and/or duplicate user plane traffic for the first and second UEs 902, 903, and so comprises respective connections to the first and second user plane functions 906, 907. The second RHF further comprises a connection to the data network 917.

In this example of FIG. 9, two UEs each have at least one PDU Session anchored at different UPFs 906, 907, and there is an external replication and elimination function comprised in RHF 910 that replicates and/or eliminates user traffic.

In the third and fourth example architectures, traffic of different single access PDU Sessions (of one or multiple UEs) is converged on a single RHF on both sides. This single RHF is responsible for traffic replication at the ingress and traffic elimination at the egress. Each single access PDU Session has its own UPF Anchor.

In this fourth example architecture the first UE 902 and/or the second UE 903 may signal their capability to support RHF rules as described above in relation to FIG. 7B.

Further, as described above, the network may configure UE Route Selection Policy rules in the first and/or second UE to provide the rules on when to establish redundant PDU Sessions for a given data network name and/or S-NSSAI, Application identifier ID, etc.

The first UE 902 of FIG. 9 may initiate a PDU Session establishment by signalling a request for this establishment to the first session management function 908. The request may comprise a data network name, and/or S-NSSAI. The request may optionally comprise an RSN/PDU Session Pair identifier when this information is available to the first UE 902.

Based on the information comprised in the received session establishment request, the SMF 908 may select a user plane function (i.e., first user plane function 906 and second RHF 911) on the network side for the UE. Upon establishment of N4 and/or N4* session, the SMF 908 may store an identifier for the N4/N4* session, and/or an RHF address. This information may be stored in a network function such as, for example, a UDR, and/or a BSF. The SMF 908 may additionally or alternatively provide the RHF address to the first UE 902 via session management signalling (e.g., non access stratum signalling). For example, this RHF address may be provided to the first UE 902 from the SMF 908 using a PDU Session establishment accept message. When the first UE 902 receives an address for the second RHF 911, the first UE 902 may forward this information to the first RHF 901. The first RHF 901 may provide the received address for the second RHF 911 to any other UEs collocated in a same device as the first UE 902 (i.e., to the second UE 903 in the present example).

The second UE 902 may initiate a second PDU session with the SMF 908. In this example, the second UE 902 may signal a second PDU session request to request that a session be established for the second UE 902. On receipt of the second PDU session request, the SMF may select a different user plane function to the first user plane function selected for the first PDU session request, while also selecting the same RHF as the RHF selected for the first PDU session request. The SMF may use the Data Network name and/or the S-NSSAI to select the same RHF. When the second UE 903 provides the same RHF address to the SMF as part of second PDU Session request, then the SMF may use the RHF address provided by the UE. When the UE does not provide the SMF with an RHF address, the SMF may retrieve an identifier for N4* session and/or the RHF address from UDM/UDR and/or from the BSF.

The RHF rules may be provisioned to the device comprising the first RHF 801 and the UR 802, and to the second RHF as described above in relation to FIG. 7B.

The previous examples of FIGS. 6 to 9 assume that most, if not all, of the information used for session bundling are exchanged over session management signalling. However, it is understood that this is only one example of how the information may be exchanged and that other mechanisms may be used to exchange such information. For example, UE Route Selection Policy mechanisms (or other mechanisms) may be extended to signal at least some of the relevant information as illustrated in the following.

For example, the UE Route Selection Policy Rules may be extended to comprise RHF rules. As RHF rules terminate in the RHF function of the device, the first and/or second UE may forward any message comprising RHF rules without reading or otherwise interpreting the RHF rules. Other parts of the UE Route Selection Policy rules may terminate as usual in the first and/or second UE.

Where existing mechanisms are expanded for providing RHF rules to an RHF located at a UE side, extensions to these mechanisms may be introduced to indicate that at least part of the received information/rules is to forwarded to the RHF collocated with a UE by the UE. For example, a new indicator may be comprised in the signalling. The new indicator may indicate that the UE Route Selection Policy rules comprise at least one RHF rule for forwarding to the RHF.

In all of the above examples, it is assumed that the RHF is aware of all the UE(s) in the device that the RHF is collocated in. Further, it is assumed that the UE(s) collocated thereto may update the device's RHF function with their respective identifiers, as well as providing additional information relating to availability of at least one UE comprised in the device (e.g., the reachability of at least one UE comprised in the device), supported accesses (i.e., what type of access technologies the UE may use to connect to a network/service), and/or an Internet Protocol address/prefix of PDU Sessions established by the UE(s). When this information is provided may be controlled by extensions to UE Route Selection Policy rules, or by other information available in the multiple UEs. The updates may be provided on a periodic basis. The updates may be provided on an aperiodic basis (e.g., only when a change is made).

In the above examples, the RHF rules may comprise different types of information.

For example, the RHF rules may comprise at least one traffic descriptor and/or Application identifier that map to specific applications. This information may be used by the RHF to analyse which UE(s) and access link(s) may be used for communications for a particular application. The communications may be performed using a single UE or by using multiple UEs).

The access link(s) may be identified based on an address, such as an Internet Protocol address, for each access link. The RHF rules may further comprise conditions for the selection of the UEs (e.g. battery state).

The RHF rules may indicate an access type (e.g., 3GPP access or non-3GPP access) to use for each link for the application traffic.

As another example, the RHF rules may comprise a number of links that are allowed for the RHF to use for forwarding application traffic.

The RHF rules may comprise an indication of a network type to be used for at least some of the application traffic (e.g., Public Landline Mobile Networks (PLMNs) or Stand-alone Non-Public Networks (SNPNs)). The RHF rules may comprise a corresponding network identifier for the network type.

The RHF may be provided with identifiers of those UEs of the collocated UEs that are allowed to be used for establishing redundant sessions for a given application.

As another example, the RHF may be provided with Internet Protocol addresses of at least some of the PDU Sessions of the collocated UEs as reported by the UE(s).

The RHF rules may comprise rules for failure handling. Such failure handling rules may indicate what the RHF should do when at least one of the UEs fails (i.e., when at least one of the UEs is unable to exchange traffic with the network). Such failure handling rules may indicate which other UE of the collocated UEs is to be used as a backup for signalling the traffic of the failed UE(s). Detection of UE failure may be implemented internally within the device.

When using UE Route Selection Policies, the following extra indications may be included in the signalling. First, there may be provided a capability indication signalled by a UE that indicates that the UE is locally connected with an RHF (i.e., that the UE is collocated in a same device as an RHF). Second, there may be provided in UE Route Selection Policy data received by the UE that comprises an RHF Rules indicator marking the container that comprises the RHF rules to be forwarded to the RHF.

At least some of the above examples assumed that the establishment of a redundant PDU Session is determined by the operator based on UE Route Selection Policy and/or based on RHF rules. However, when the network indicates that a PDU Session may be upgraded to a redundant PDU session (within UE Route Selection Policy and/or RHF rules), the UE/Device may independently determine when to establish multiple redundant PDU Sessions, even though when not mandated by UE Route Selection Policy/RHF rules. Upon establishment of each of the multiple redundant PDU Sessions, the UE may provide the session bundle identifier (if received from the SMF), or may locally generate a bundle identifier and provide the locally generated bundle identifier to the SMF when requesting session estab-lishment.

FIGS. 10 to 13 are flowcharts illustrating features of the above-provided examples. Even if not explicitly stated below, it is understood that these apparatuses may interact with each other. It is further understood that features of the above examples may be combined with the disclosure of these flowcharts without loss to the generality of the fol-lowing disclosure.

Figures 10, 11, 13:
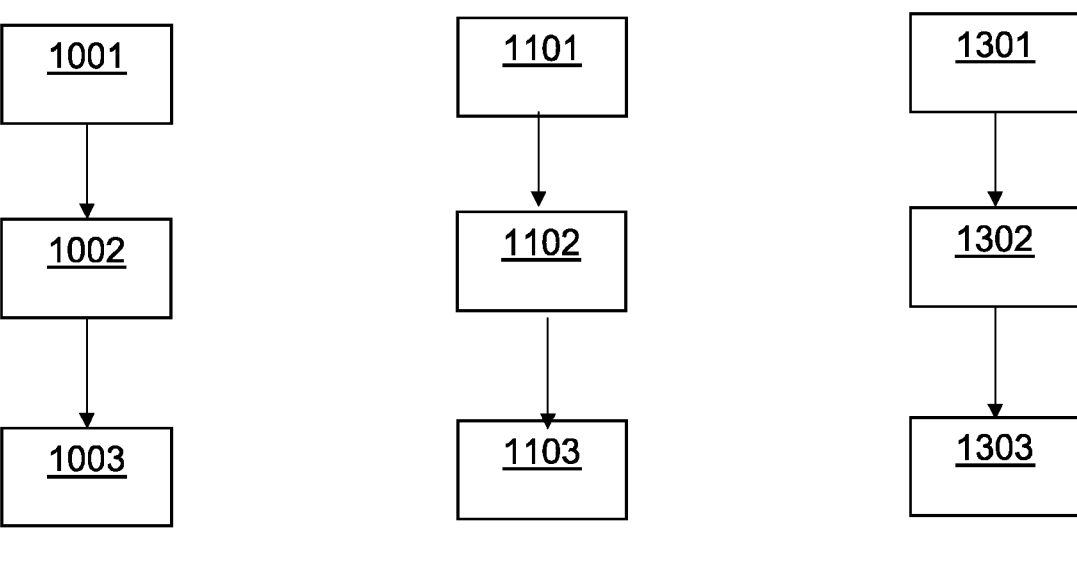
FIGS. 10 to 14 are flow charts illustrating example operations of example apparatus.

FIG. 10 is a flow chart illustrating operations that may be performed by an apparatus of a network function. This network function of FIG. 10 may be a policy control function.

At 1001, the apparatus receives an indication that a first user equipment and/or a first user plane function configured to transmit first user traffic is associated with a first repli-cation handling function, the first replication handling func-tion being configurable to coordinate at least one replication-based redundancy mechanism performed on at least part of said first user traffic.

At 1002, the apparatus determines a first set of replication rules for use by the first replication handling function when determining when the at least one replication-based redun-dancy mechanism is performed on at least part of said first user traffic.

At 1003, the apparatus causes the first set of replication rules to be provided to the first replication handling function.

The determining the set of replication rules may comprise determining the first set of replication rules using a rule selection policy that is common to said network function and another network function.

The apparatus may identify a second replication handling function associated with at least one user plane function configured to receive at least part of said first user traffic and/or to transmit second user traffic to the first user equip-ment and/or to the first user plane function. The apparatus may determine a second set of replication rules for use by the second replication handling function when determining when to perform at least one replication-based redundancy mechanism on at least part of said second user traffic. The apparatus may cause the second set of replication rules to be provided to the second replication handling function.

In a specific example of FIG. 10, the first set of replication rules are associated with a replication handling function of the first user equipment (which may or may not be com-prised in a same device/apparatus as the replication handling function and/or a second user equipment), and the second set of replication rules are associated with a replication handling function of a user plane function (such as the first user plane function, or another user plane function).

The apparatus may determine that the first user equipment is comprised in a same apparatus as a second user equipment and/or that the first user plane function is comprised in a same apparatus as a second user plane function. The appa-ratus may be comprised in a different apparatus to the first user plane function, and/or the first user equipment, and/or the second user plane function, and/or the second user equipment.

FIG. 11 illustrates operations that may be performed by an apparatus for a first user equipment. The user equipment may be the user equipment mentioned above in relation to FIG. 10.

At 1101, the apparatus signals, to a network, an indication that the first user equipment is associated with a first replication handling function, the first replication handling function being configurable to coordinate at least one rep-lication-based redundancy mechanism performed by the first user equipment on first user traffic. This signalling may be comprised in an indication of a user capability. This signal-ling may be signalled to a session management function and/or to a policy and control function, and/or to an access and mobility function. When the information is provided to an AMF, the AMF may cause that information to be provided to a PCF.

At 1102, the apparatus may receive, from the network in response to said signalling, a first set of replication rules for use by the replication handling function when determining when the at least one replication-based redundancy mecha-nism is performed by the first user equipment.

At 1103, the apparatus may provide the first set of replication rules to the replication handling function.

The replication handling function may use the replication rules to determine when at least one replication-based redun-dancy mechanism is to be used. A replication-based redun-dancy mechanism is a mechanism that involves transmitting two versions of the same data packet (e.g., along different transmission paths), where the decision to transmit a dupli-cated packet is made prior to a transmission of the packet being duplicated.

The signalling the indication may comprise comprising said indication in a capability indication during registration of the user equipment with the network.

The apparatus may signal a first request to establish a first data session, receive, from the network, a bundle identifier for identifying sessions linked to the first session in response to signalling the first request, and provide the bundle identifier to the replication handling function. The network may be a session management function.

The apparatus may signal, to a network, a request to establish a second data session, wherein said request comprises the bundle identifier.

The apparatus may comprise the first user equipment, the replication handing function, and a second user equipment. The apparatus may comprise the first user equipment and the second user equipment, with the replication handling function being comprised in a separate apparatus such that the replication handling function is not collocated with the first user equipment.

Figures 12, 14:
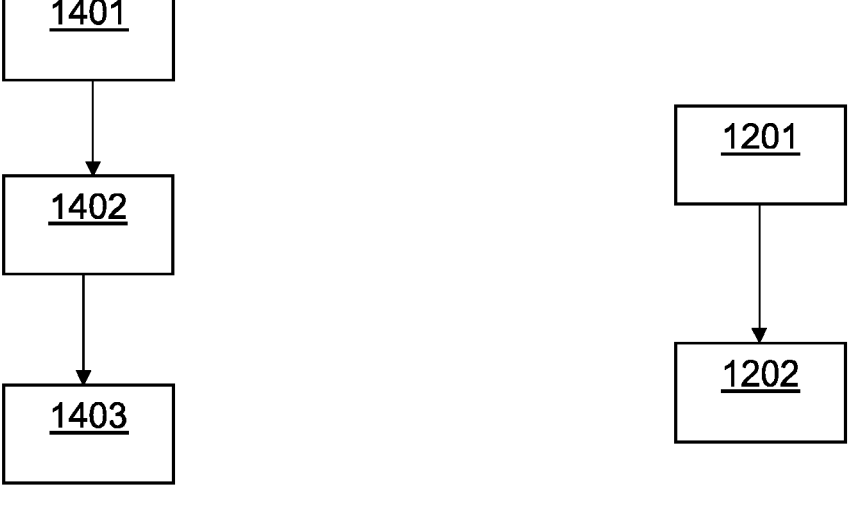

FIG. 12 illustrates operations that may be performed by an apparatus for a first replication handling function associated with a first user equipment. The first user equipment may be as described above in relation to FIG. 11.

At 1201, the apparatus may cause signalling, to a network, an indication that the first user equipment is associated with the first replication handling function, the first replication handling function being configurable to coordinate at least one replication-based redundancy mechanism performed by the first user equipment on first user traffic. This indication may be provided in, for example, a UE capability information element.

At 1202, the apparatus may receive, from the at least one user equipment, a first set of replication rules.

The apparatus may use the first set of replication rules to determine when at least one replication-based redundancy mechanism is be performed by the first user equipment for a first data packet; and cause the first user equipment to perform the at least one replication-based redundancy mechanism for the first packet when it is determined that said at least one replication-based redundancy is to be performed.

The first replication handling function may be associated with a second user equipment collocated in a same apparatus as the first user equipment.

In such a case, the apparatus may use the first set of replication rules to determine when at least one replication-based redundancy mechanism is be performed by the second user equipment for a second data packet; and cause the second user equipment to perform the at least one replication-based redundancy mechanism for the second packet when it is determined that said at least one replication-based redundancy is to be performed.

The apparatus may cause signalling, to the network, an indication that the second user equipment is associated with the first replication handling function. This indication may be provided in a capability information element. This indication may be, for example, a bundle identifier received by the first user equipment when the first user equipment was establishing a session. The bundling identifier may be provided by the second user equipment when the second user equipment is establishing a session for user traffic to be transmitted by the second user equipment. In other words, the apparatus may cause the second user equipment to signal to the network the identification that the second user equipment is associated with the first replication handling function/the session established by the first user equipment.

FIG. 13 is a flow chart illustrating potential operations that may be provided by an apparatus for a session management function.

At 1301, the apparatus receives, from a first user equipment, a first request to establish a first data session for transmitting first data traffic.

At 1302, the apparatus determines, using at least one identifier comprised in the first request whether the first data session is linked or will be linked to a second data session for transmitting the first data traffic.

At 1303, in response to a positive determination, the apparatus signals, to a storage function and/or to the first user equipment, an indication of mapping information for the first data session Said mapping information for the first data session may comprise at least one of: a session identifier and/or an indication of a user plane entity selected for the first session. For example, there may be provided an indication of a PDU session and/or an indication of an N4 session identifier.

The apparatus may receive, from a user equipment, a second request to establish a further data session. The user equipment may be the first user equipment. The user equipment may be a second/further user equipment. When the user equipment is a second/further user equipment, this second user equipment may be collocated in a same apparatus at the first user equipment.

The apparatus may determine that the further data session may be linked to the first data session and, in response to a positive determination: retrieve, from a storage function, mapping information indicating a first session and a user plane entity selected for the first session; selecting a same user plane entity for the first and further data sessions using the retrieved mapping; and provide the selected user plane entity with information for mapping the first and further data sessions.

The apparatus may retrieve mapping information for the further session from the storage function. This mapping information may be, for example, a bundling identifier, or some functionally equivalent identifier.

The apparatus may receive, from a policy and control function, a first set of replication rules to be applied by a replication handling function for the first and second sessions, and provide the first set of replication rules to the replication handling function.

The apparatus may provide the first set of replication rules to the replication handling function at the user equipment side and/or to the replication handling function at the network side.

FIG. 14 illustrates operations that may be performed by an apparatus for a storage function located in a network. The apparatus may be, for example, a unified data management entity, a unified data repository, and/or a binding support function.

At 1401, the apparatus receives, from a network function, mapping information indicating a data session and a user plane entity selected for that session. The network function may be a session management function.

At 1402, the apparatus stores said mapping information.

At 1403, in response to a request from a network function, the apparatus may provide said mapping to the requesting network function or providing to the requesting network function an indication that no such mapping exists.

In all of the above examples relating to mapping, the mapping may comprise at least one of: an identifier and/or address of the user plane entity; a bundle identifier for a set of sessions that comprises at least said session, the bundle identifier being assigned to the set of sessions by the user plane entity; and/or a session identifier for an interface between a session management function and a user plane entity.

In all of the above examples, the first set of replication rules may relate to how to establish the replication-based redundancy mechanism for selected user traffic, and comprises at least one of: a traffic descriptor, and/or an application identifier, and/or an access technology type signalling for user traffic, and/or a number of links for forwarding user traffic, and/or a network identifier for forwarding user traffic, and/or respective identifiers for any user equipment that may transmit the user traffic, and/or at least one indication of a failure handling mechanism to use when the replication-based redundancy mechanism fails, and/or an address of a packet data unit session used for the user traffic.

Further, in all of the above examples, each replication rule in said set of replication rules may be associated with a respective identifier.

Figure 2:
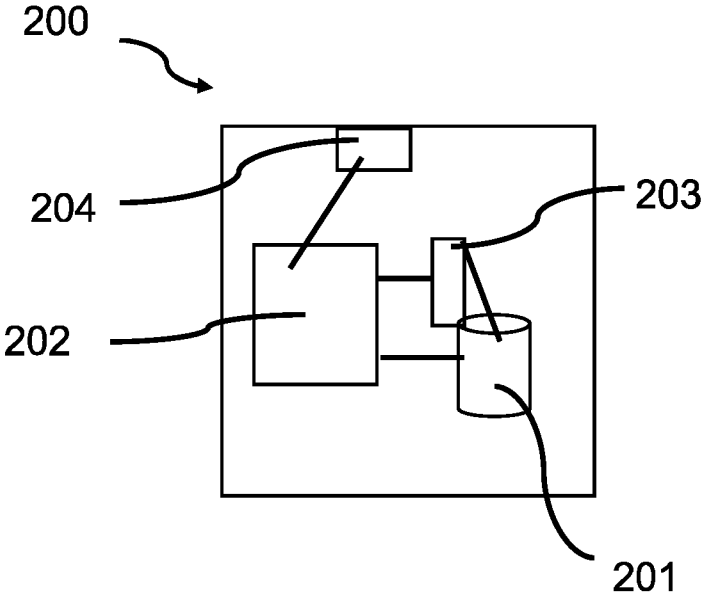
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
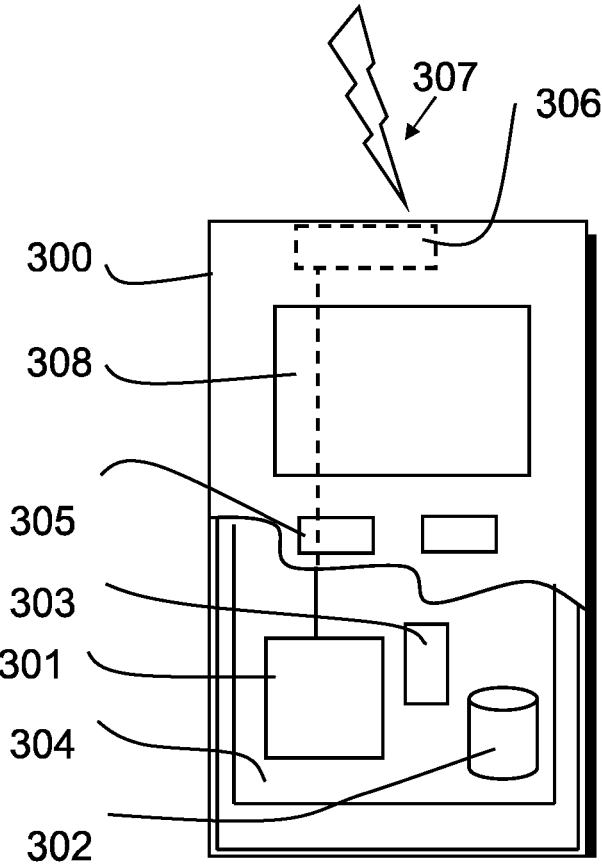
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Nonlimiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
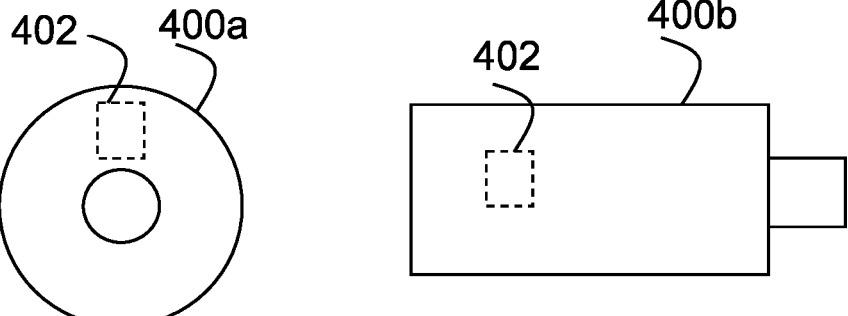
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400*a* (e.g. computer disc (CD) or digital versatile disc (DVD)) and 400*b* (e.g. universal serial bus (USB) memory stick) storing instructions and/or parameters 402 which when executed by a processor allow the processor to perform one or more of the steps of the methods of FIG. 10 and/or FIG. 11 and/or FIG. 13, and/or FIG. 12, and/or FIG. 14, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 10 and/or FIG. 11 and/or FIG. 12, and/or FIG. 13, and/or FIG. 14, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A)

or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
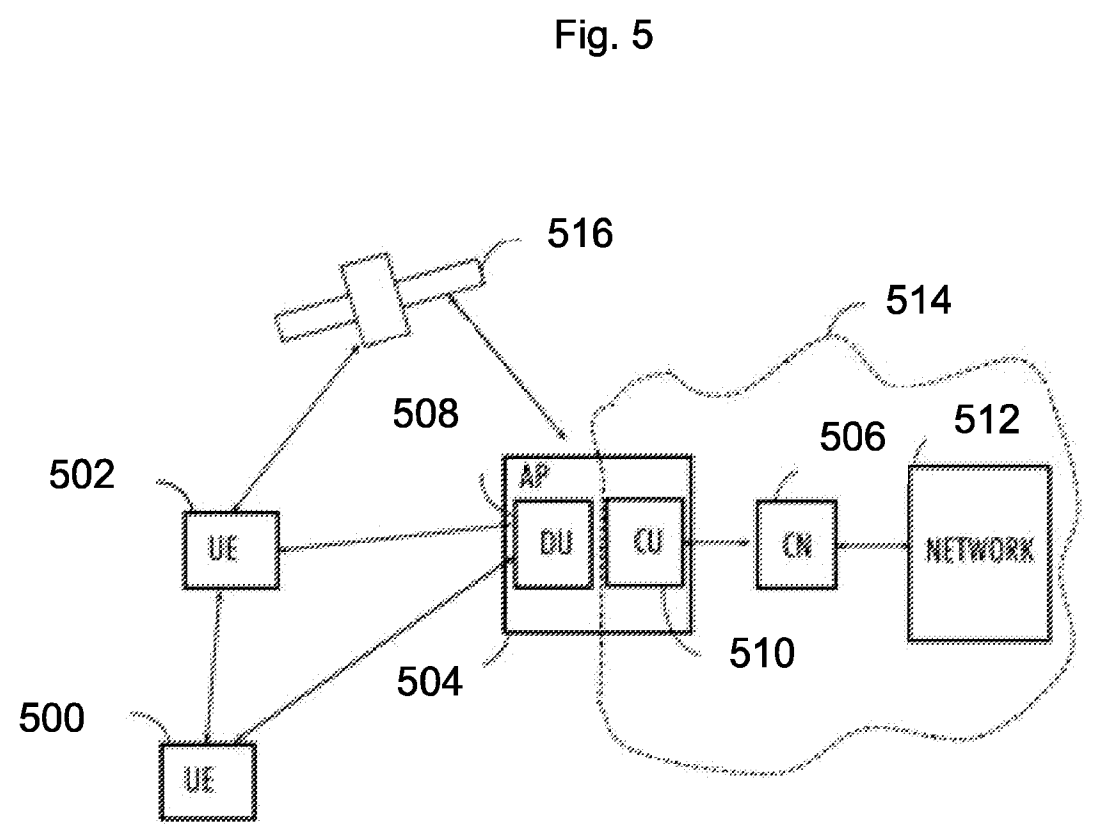

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g)NodeB serving devices in a cell. In one example, the node 504 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 506 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 5). A HNB Gateway (HNB-GW), which is typically installed within an operator's network may aggregate traffic from a large number of HNBs back to a core network.

The invention claimed is:

1. An apparatus comprising:

at least one processor; and at least one memory storing instructions that, when executed by the at least one processor, cause the apparatus at least to perform operations, the operations comprising:

receiving, from a user equipment, an indication indicating that the user equipment that is configured to transmit user traffic is associated with a first replication handling function, the first replication handling function being configured to coordinate replication of at least part of said user traffic;

determining, before establishment of a first data session between the user equipment and a user plane entity of a network, a first set of replication rules for use by the first replication handling function, the first set of replication rules comprising a bundling identifier that indicates that at least one data session of the user equipment is to be linked to at least one other data session, wherein the determining the first set of replication rules comprises determining a first replication rule of the first set of replication rules that indicates when the replication of the at least part of said user traffic is to be performed;

providing the first set of replication rules to the first replication handling function;

identifying a second replication handling function associated with the user plane entity, wherein the user plane function is configured to receive the at least part of said user traffic;

determining, before establishment of a second data session between the user equipment and the user plane entity, a second set of replication rules for use by the second replication handling function, wherein the determining the second set of replication rules comprises determining a replication rule of the second set of replication rules that indicates when to discard the at least part of user traffic that is replicated; and providing the second set of replication rules to the second replication handling function.

2. A user equipment (UE) comprising:

at least one processor; and at least one memory storing instructions that, when executed by the at least one processor, cause the UE at least to perform operations, the operations comprising:

signalling, to a network, an indication that the UE is associated with a replication handling function, the replication handling function being configured to coordinate the UE to perform replication of at least part of user traffic;

receiving, from the network in response to said signalling, a set of replication rules for use by the replication handling function, the set of replication rules comprising a first replication rule indicating when replication of the at least part of said user traffic is to be performed; and providing the set of replication rules to the replication handling function;

sending, to the network, a first request to establish a first data session for the UE;

receiving, from the network, a first response to the first request, the first response including session bundling information that indicates the first data session is to be part of a bundle of data sessions, wherein the session bundling information comprises a bundle identifier and information about a user plane entity of the network that is selected for the first data session;

sending, towards the network, a second request to establish, for the UE, a second data session, the second request comprising the session bundling information;

receiving, from the network, a second response to the second request, the second response indicating that the second data session has been established between the UE and the user plane entity;

receiving, from a replication handling function associated with the UE, user data of the UE and a replicate of the user data of the UE;

sending the user data towards the user plane entity over the first data session; and sending the replicate of the user data towards the user plane entity over the second data session.

3. The UE as claimed in claim 2, wherein the signalling comprises signaling, to the network, said indication in a capability indication during registration of the UE with the network.

4. The apparatus as claimed in claim 1, wherein the first set of replication rules further comprises at least one of: a second replication rule indicating a traffic descriptor, a third replication rule indicating an application identifier, a fourth replication rule indicating an access technology type signalling for said user traffic, a fifth replication rule indicating a number of links for forwarding said user traffic, or a sixth replication rule indicating network identifier for forwarding said user traffic.

5. A method comprising:

receiving, from a first user equipment, an indication indicating that the user equipment that is configured to transmit user traffic is associated with a first replication handling function, the first replication handling function being configured to coordinate replication of at least part of said user traffic;

determining, before establishment of a first data session between the user equipment and a user plane entity of a network, a first set of replication rules for use by the first replication handling function, the first set of replication rules comprising a bundling identifier that indicates that at least one data session of the user equipment is to be linked to at least one other data session, wherein the determining the first set of replication rules comprises determining a first replication rule of the first set of replication rules that indicates when the replication of the at least part of said user plane traffic is to be performed;

providing the first set of replication rules to the first replication handling function;

identifying a second replication handling function associated with the user plane entity, wherein the user plane function is configured to receive the at least part of said user traffic;

determining, before establishment of a second data session between the user equipment and the user plane entity, a second set of replication rules for use by the second replication handling function, wherein the determining the second set of replication rules comprises determining a replication rule of the second set of replication rules that indicates when to discard the at least part of user traffic that is replicated; and providing the second set of replication rules to the second replication handling function.

6. A method of a user equipment (UE), the method comprising:

signalling, to a network, an indication of association of the UE with a replication handling function, the replication handling function being configured to coordinate the UE to perform replication of at least part of user traffic;

receiving, from the network in response to said signalling, a set of replication rules for use by the replication handling function, the set of replication rules comprising a first replication rule indicating when replication of the least part of the user traffic is to be performed;

providing the set of replication rules to the replication handling function;

sending, to the network, a first request to establish a first data session for the UE;

receiving, from the network, a first response to the first request, the first response including session bundling information that indicates the first data session is to be part of a bundle of data sessions, wherein the session bundling information comprises a bundle identifier and information about a user plane entity of the network that is selected for the first data session;

sending, towards the network, a second request to establish, for the UE, a second data session, the second request comprising the session bundling information;

receiving, from the network, a second response to the second request, the second response indicating that the second data session has been established between the UE and the user plane entity;

receiving, from a replication handling function associated with the UE, user data of the UE and a replicate of the user data of the UE;

sending the user data towards the user plane entity over the first data session; and sending the replicate of the user data towards the user plane entity over the second data session.

7. The UE as claimed in claim 2, wherein the set of replication rules further comprises at least one of: a second replication rule indicating a traffic descriptor, a third replication rule indicating an application identifier, a fourth replication rule indicating an access technology type signalling for said user traffic, a fifth replication rule indicating a number of links for forwarding said user traffic, or a sixth replication rule indicating network identifier for forwarding said user traffic.

8. The UE as claimed in claim 2, wherein the information about the user plane entity of the network that is selected for the first data session comprises an identifier of the user plane entity or an address of the user plane entity.

9. The UE as claimed in claim 2, wherein the session bundling information further comprises a session identifier for an interface between a session management function (SMF) and the user plane entity.

10. The method as claimed in claim 6, wherein the information about the user plane entity of the network that is selected for the first data session comprises an identifier of the user plane entity or an address of the user plane entity.

11. The method as claimed in claim 6, wherein the session bundling information further comprises a session identifier for an interface between a session management function (SMF) and the user plane entity.

\* \* \* \* \*